(12) United States Patent
Larkin et al.

(10) Patent No.: US 6,888,566 B2
(45) Date of Patent: May 3, 2005

(54) METHOD AND APPARATUS FOR UNIFORM LINEAL MOTION BLUR ESTIMATION USING MULTIPLE EXPOSURES

(75) Inventors: Kieran Gerard Larkin, Putney (AU); Dominic Yip, Lindfield (AU); Ian Richard Gibson, Coogee (AU)

(73) Assignee: Canon Kabushiki Kaisha, Tokyo (JP)

(*) Notice: Subject to any disclaimer, the term of this patent is extended or adjusted under 35 U.S.C. 154(b) by 736 days.

(21) Appl. No.: 09/735,809

(22) Filed: Dec. 14, 2000

(65) Prior Publication Data

US 2001/0021224 A1 Sep. 13, 2001

(30) Foreign Application Priority Data

Dec. 14, 1999 (AU) .............................................. PQ4641
Dec. 14, 1999 (AU) .............................................. PQ4643

(51) Int. Cl.[7] ......................................... H04N 5/228
(52) U.S. Cl. ................. 348/208.4; 375/240.12
(58) Field of Search ............... 348/207.99, 208.99, 348/208.1, 208.4, 208.5, 208.6, 208.12, 208.14, 222.1; 250/208.1; 382/254, 255; 375/240.12

(56) References Cited

U.S. PATENT DOCUMENTS

| | | | |
|---|---|---|---|
| 5,321,515 A | * | 6/1994 | Kusaka et al. ............ 348/208.6 |
| 5,712,474 A | * | 1/1998 | Naneda .................... 250/208.1 |
| 5,861,916 A | * | 1/1999 | Sekine et al. .......... 348/207.99 |
| 6,049,354 A | * | 4/2000 | Sekine et al. ............ 348/208.6 |
| 6,778,210 B1 | * | 8/2004 | Sugahara et al. ........ 348/208.4 |

* cited by examiner

Primary Examiner—Tuan Ho
(74) Attorney, Agent, or Firm—Fitzpatrick, Cella, Harper & Scinto

(57) ABSTRACT

A method and apparatus (9) for estimating the blur parameters of blurred images ($g_1$, $g_2$) are disclosed. The apparatus (9) has one or more image sensors (10) for capturing the blurred images ($g_1$, $g_2$), a plurality of correlators (20, 30) for performing autocorrelation of the blurred image ($g_1$) and cross-correlation between the two images ($g_1$, $g_2$) respectively, and an error function calculator (40) for evaluating an error function over all possible displacements using the results from the correlators (20, 30). The apparatus (9) further includes an extreme locater (50) for finding the displacement with the minimum value for the error function.

25 Claims, 16 Drawing Sheets

METHOD AND APPARATUS FOR UNIFORM LINEAL MOTION BLUR ESTIMATION USING MULTIPLE EXPOSURES

TECHNICAL FIELD OF THE INVENTION

The present invention relates generally to image processing and, in particular, to a method and apparatus for estimating motion from image blur. An image sensor with a capability to capture multiple concurrent (overlapping in time) images which forms part of a system used to estimate a uniform lineal motion using error minimisation is also disclosed.

BACKGROUND ART

Motion estimation is a useful tool in many aspects of image processing. Motion estimation is used in video compression (for example MPEG2). Motion estimation is also useful in identifying those portions of an image that may require updating on a display. Motion estimation further permits various portions of an image to have assigned to them motion vectors, for example as metadata, that are interpretable to provide for enhanced image processing. Motion detection may also be used for object tracking and content analysis and many other computer vision applications.

Known arrangements for performing motion estimation of video images typically use one of the following methods:

(i) estimation of illumination partial derivatives in combination with optical flow;

(ii) local (block based) calculation of a cross-correlation between successive images and using maxima to estimate the shift between images; or (iii) estimation of the motion blur in any one image (using a variety of methods such as blind de-convolution, maximum likelihood estimation etc) to then use as a motion vector in optical flow.

One deficiency of existing motion estimation arrangements is that they operate between adjacent frames of an image sequence, or between odd and even fields of an interlaced image within such a sequence, As a consequence, known arrangements are limited to the image sampling rate either as frames or fields. However, motion may yet occur during the sampling of, or between, such frames or fields. Known arrangements also lack fine resolution of the magnitude of motion. For high quality reproduction, which includes consideration of issues such as storage efficiency, such motion is desired to be considered.

DISCLOSURE OF THE INVENTION

It is an object of the present invention to substantially overcome, or at least ameliorate, one or more disadvantages of existing arrangements.

According to a first aspect of the invention, there is provided a method of estimating motion of a moving object, said method comprising the steps of:

capturing at least first and second blurred images of said moving object, the blur in said images arising from at least motion blur of said object, wherein exposure durations of said first and second blurred images overlap at least partially;

generating an error function, said error function being a function of said first blurred image and said second blurred image;

minimising said error function; and estimating said motion of said object from said minimised error function.

According to a second aspect of the invention, there is provided an apparatus for estimating motion of a moving object, said apparatus comprising;

one or more capture devices for capturing at least first and second blurred images of said moving object, the blur in said blurred images arising from at least motion blur of said object, wherein exposure durations of said blurred images overlap at least partially;

means for generating an error function, said error function being a function of said first blurred image and said second blurred image;

means for minimising said error function; and means for estimating said motion of said object from said minimised error function.

According to another aspect of the invention, there is provided an apparatus for estimating motion of a moving image, said apparatus comprising:

an image sensor for capturing pixels of at least first and second images in which one of said images is sampled during a formation of at least one other of said images;

means for comparing said images to determine at least one motion vector for association with one of said images.

Other aspects of the invention are also disclosed.

BRIEF DESCRIPTION OF THE DRAWINGS

A number of embodiments of the present invention will now be described with reference to the drawings, in which.

DETAILED DESCRIPTION INCLUDING BEST MODE

Consider an ideal two-dimensional digital image signal, represented as a function $f(x,y)$, where x and y are the horizontal and vertical image coordinates. The image signal $f(x,y)$ is defined for all integer values of x and y, and undefined for all non-integer values of x and y. The digital image signal $f(x,y)$ is typically obtained by sampling an analog image, for instance, an image on film.

In practice, this ideal image signal $f(x,y)$ is distorted by various image degradations. In this specification, image blurring is considered as well as additive noise. The image blurring to be considered is a special form of blur, namely uniform lineal blur typically caused by motion in a plane at an oblique angle to a line of sight of a camera used for capturing the image. The blurred image is represented as $g_1$. In the preferred implementation, two different blurred images are used, namely $g_1$ and $g_2$.

The blurred images $g_1$ and $g_2$ can be represented as the result of a pair of blur functions $b_1$ and $b_2$ operating on the image signal $f(x,y)$. The blurred images $g_1$ and $g_2$ can therefore be represented using the convolution (*) operator as:

$$g_1(x,y) = f(x,y) * b_1(x,y) + n_1(x,y) \quad (1)$$

$$g_2(x,y) = f(x,y) * b_2(x,y) + n_2(x,y) \quad (2)$$

where $n_1$ and $n_2$ are additive noise signals.

Figure 1:
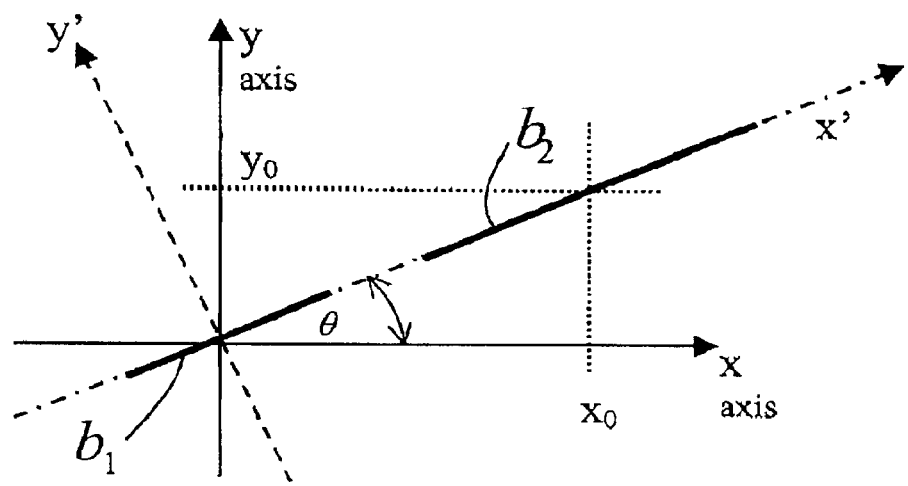
FIG. 1 shows blur functions $b_1$ and $b_2$ representing lineal (motion) blur of spatial extent $2a_1$ and $2a_2$ respectively occurring in a direction at angle $\theta$ to the x axis.

An assumption is made that the motion is lineal and uniform over the image region under consideration. The blur functions $b_1$ and $b_2$ represent one dimensional (motion) blur of spatial extent $2a_1$ and $2a_2$ respectively occurring in a direction at angle $\theta$ to the x axis as illustrated in FIG. 1. Consequently the blur functions $b_1$ and $b_2$ can be represented as follows:

$$b_1(x,y) = \frac{1}{2a_1} rect\left(\frac{x'}{2a_1}\right) \cdot \delta(y') \quad (3)$$

$$b_2(x,y) = \frac{1}{2a_2} rect\left(\frac{x' - x'_0}{2a_2}\right) \cdot \delta(y' - y'_0) \quad (4)$$

wherein $$rect\left(\frac{p}{2s}\right) = 0 \text{ for } p > s, \text{ or} \quad (5)$$

$$1 \text{ for } |p| < s, \text{ and}$$

$\delta(p)$ is the Dirac delta function such that:

$$\int_{-\infty}^{\infty} f(x) \cdot \delta(x - x_0) \, dx = f(x_0) \quad (6)$$

wherein $f$ is any function. (x', y') are rotated coordinates having the following relations:

$$\left.\begin{array}{l} x' = +x\cos(\theta) + y\sin(\theta) \\ y' = -x\sin(\theta) + y\cos(\theta) \end{array}\right\} \quad (7)$$

As will be apparent from FIG. 1, the rotated coordinates have one coordinate aligned with the direction of blur. The centre of the second blur function $b_2$ is offset by an amount $(x_0, y_0)$ from the centre of the first blur function $b_1$. In essence, the blur functions $b_1$ and $b_2$ convert all point intensities of the image signal $f(x,y)$ into linear smears of length directly proportional to the respective exposure times and the image velocity.

The two dimensional Fourier transform $G(u,v)$ of an arbitrary signal $g(x,y)$ is defined as:

$$G(u,v) = \int_{-\infty}^{\infty} \int_{-\infty}^{\infty} g(x,y) \exp(-2\pi i[ux + vy]) \, dx \, dy \quad (8)$$

where u and v are the spatial frequency coordinates. Consequently, the transforms $G_1$ and $G_2$ of the blurred images $g_1$ and $g_2$ can be written as:

$$G_1(u,v) = F(u,v) \cdot B_1(u,v) + N_1(u,v) \quad (9)$$

$$G_2(u,v) = F(u,v) \cdot B_2(u,v) + N_2(u,v) \quad (10)$$

The discrete Fourier transforms $B_1$ and $B_2$ of the blur functions $b_1$ and $b_2$ have a simple (one dimensional) form when expressed in relation to rotated frequency axes, namely:

$$\left.\begin{array}{l} u' = +u\cos(\theta) + v\sin(\theta) \\ v' = -u\sin(\theta) + v\cos(\theta) \end{array}\right\} \quad (11)$$

$$B_1(u,v) = \frac{\sin(2\pi u' a_1)}{2\pi u' a_1} \quad (12)$$

$$B_2(u,v) = \frac{\sin(2\pi u' a_2)}{2\pi u' a_2} \cdot \exp(-2\pi i[u' x'_0]) \quad (13)$$

From Equations (9), (10), (12) and (13), the blurred image transforms $G_1$ and $G_2$ can be rewritten as:

$$G_1(u,v) = F(u,v) \cdot \frac{\sin(2\pi u' a_1)}{2\pi u' a_1} \quad (14)$$

$$G_2(u,v) = F(u,v) \cdot \frac{\sin(2\pi u' a_2)}{2\pi u' a_2} \cdot \exp(-2\pi i[u' x'_0]) + N \quad (15)$$

For simplification, the additive noise spectra terms $N_1$ and $N_2$ in Equations (9) and (10) have been substituted by a single noise spectrum term N in Equation (15). From the two blurred images $g_1$ and $g_2$, two equations and four "unknowns" (viz the function F(u,v), as well as the parameters $a_1$, $a_2$, and $x'_0$) are derived. By constraining the parameters $a_1$, $a_2$, and $x'_0$, the unknowns can be reduced to two, and a unique solution thus exists for the simultaneous Equations (14) and (15).

Figure 2A:
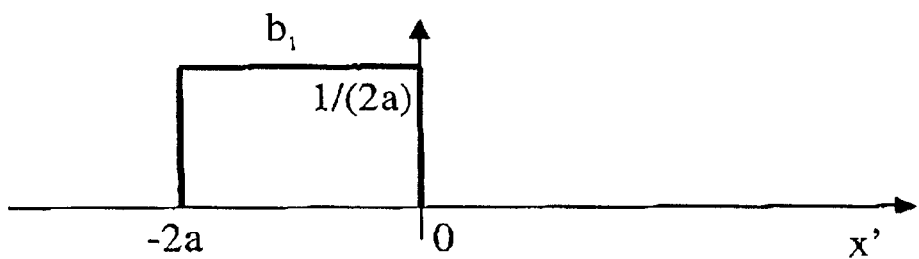
FIGS. 2A and 2B illustrate the x' component of the respective blur functions $b_1$ and $b_2$, resulting from two sequential, non-overlapping, uniform exposures with equal duration.
Figure 2B:
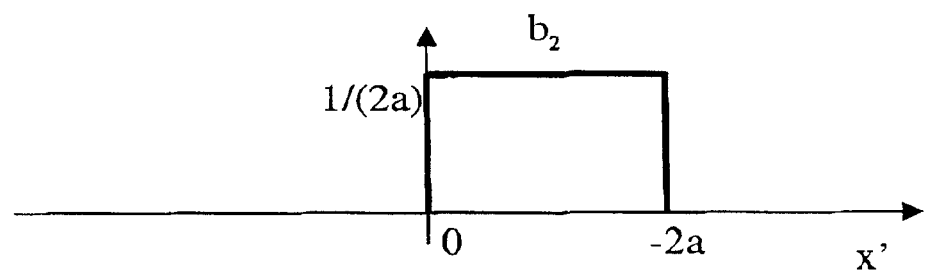
Figure 3A:
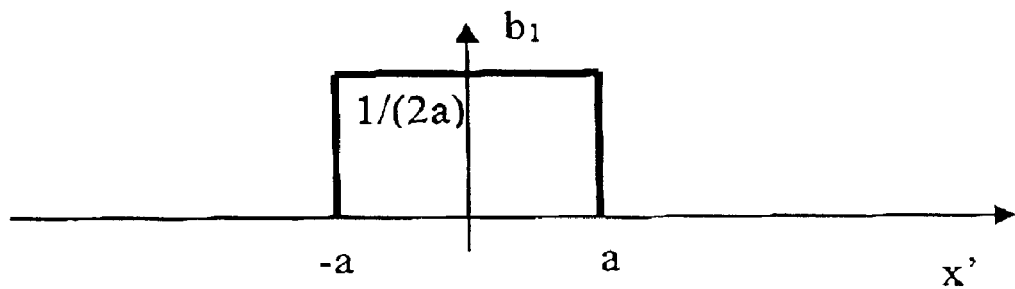
FIGS. 3A and 3B illustrate the x' component of the respective blur functions $b_1$ and $b_2$, resulting from two uniform exposures centred on the same time but one exposure twice the duration of the other.
Figure 3B:
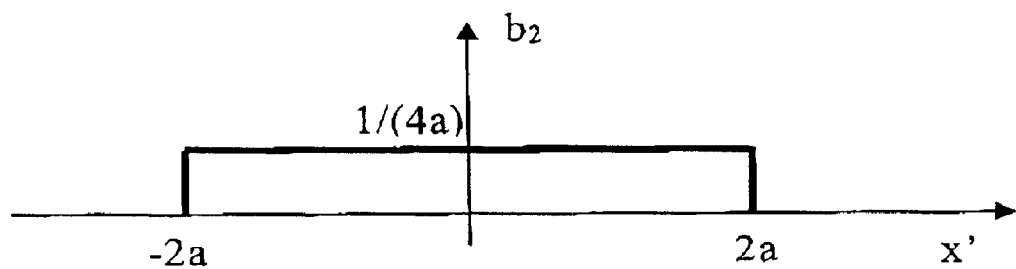
Figure 4A:
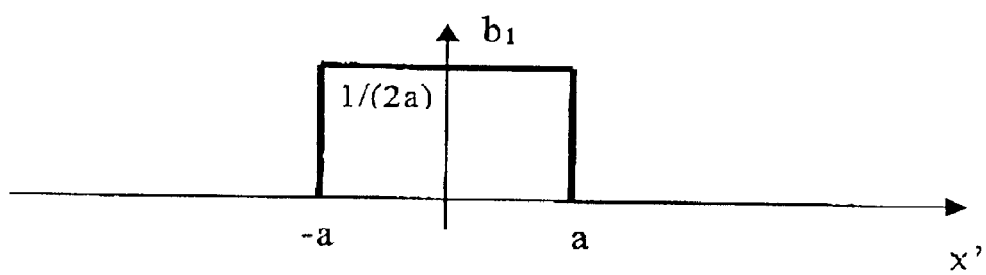
FIGS. 4A and 4B illustrate the x' component of the respective blur functions $b_1$ and $b_2$, resulting from two uniform exposures with the same start times, but with the one exposure twice the duration of the other.
Figure 4B:
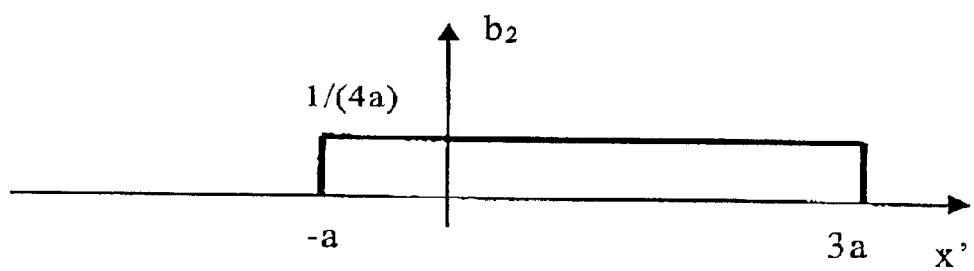
Figure 5A:
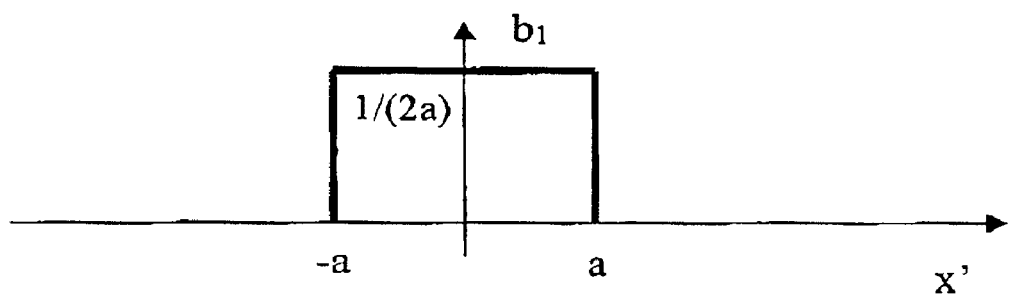
FIGS. 5A and 5B illustrate the x' components of the respective blur functions $b_1$ and $b_2$ resulting from two uniform exposures centred on the same time, but with the one exposure three times the duration of the other.
Figure 5B:
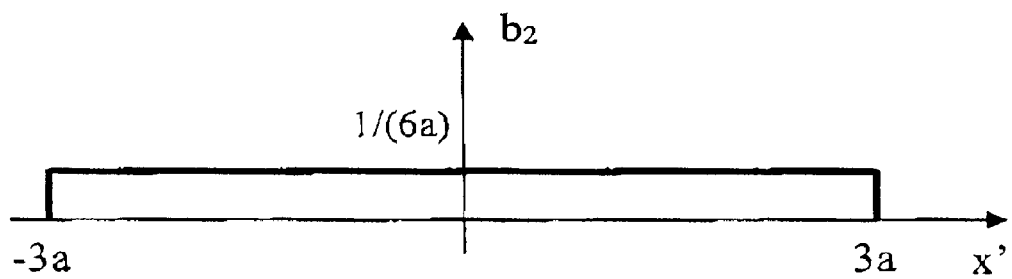
Figure 6A:
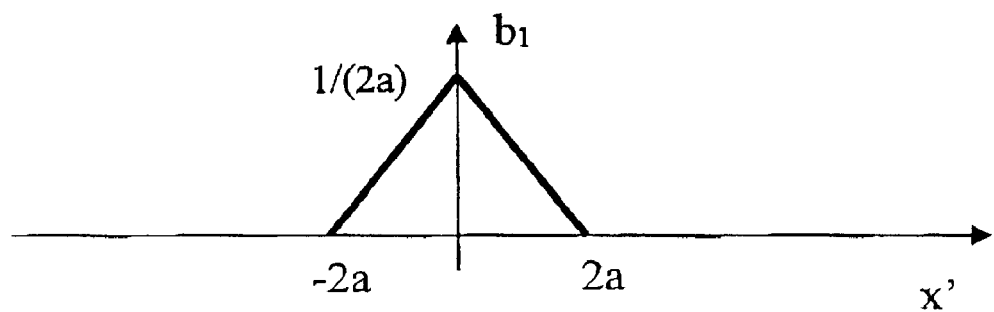
FIGS. 6A and 6B illustrate the x' components of the respective blur functions $b_1$ and $b_2$ resulting from two non-uniform exposures centred on the same time, but with the one exposure twice the duration of the other.
Figure 6B:
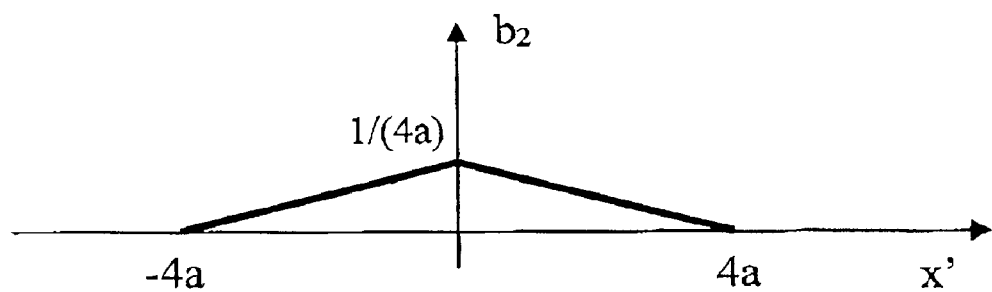

The above deduction can be performed upon two or more images. Implementations using two images include:

(a) sequential, non-overlapping, uniform exposures with equal duration, as ilustrated in FIGS. 2A and 2B;

(b) both uniform exposures centred on the same time but one exposure twice the duration of the other, as illustrated in FIGS. 3A and 3B;

(c) overlapping, uniform exposures with the same start time and one duration twice the other, as illustrated in FIGS. 4A and 4B;

(d) variations of (b) and (c) with integer exposure multiples greater than two, an example of which is illustrated in FIGS. 5A and 5B where one duration is three times that of the other; and (e) variations of (b) and (c) with non-uniform exposures, an example of which is illustrated in FIGS. 6A and 6B resulting from two non-uniform exposures centred on the same time, but with the one exposure twice the duration of the other. In this case the exposures are preferably representable by multiple convolutions of a uniform exposure pattern.

Case (a) above is, illustrated in FIGS. 2A and 2B, will not be considered further because it reduces to a well known solution of estimating pure time delay (ie. pure translational shift on the image), The blur parameter is not used in this solution. This solution only utilises the elapsed time or spatial separation between the two uniform exposures with equal duration.

FIGS. 3A and 3B illustrate the x' components of the respective blur functions $b_1$ and $b_2$ resulting from two uniform exposures centred on the same time, but with the one exposure twice the duration of the other, thereby representing Case (b) above. This particular relationship between the two exposures results in the following parameters:

$$\left. \begin{array}{l} a_1 = a \\ a_2 = 2a \\ x'_0 = 0 \\ y'_0 = 0 \end{array} \right\} \quad (16)$$

Applying these parameters to Equations (14) and (15) gives the Fourier spectra:

$$G_1(u, v) = F(u, v) \cdot \frac{\sin(2\pi u' a)}{2\pi u' a} \quad (17)$$

$$G_2(u, v) = F(u, v) \cdot \frac{\sin(4\pi u' a)}{4\pi u' a} + N(u, v) \quad (18)$$

Using a trigonometric expansion, a relationship between blurred image transforms $G_1$ and $G_2$ can be found as:

$$G_2(u, v) = F(u, v) \cdot \frac{2\sin(2\pi u' a)\cos(2\pi u' a)}{4\pi u' a} + N(u, v) \quad (19)$$

$$G_2(u,v) = G_1(u,v) \cdot \cos(2\pi u' a) + N(u,v) \quad (20)$$

The difference between blurred images $g_1$ and $g_2$ can be measured using total modulus-squared spectral "deviation" t, integrated over a representative region of the spatial frequency. The modulus-squared spectral "deviation" t can be written as a function of the blur parameter a;

$$t(a) = \iint_R |N(u,v)|^2 dudv = \iint_R |G_2(u,v) - G_1(u,v) \cdot \cos(2\pi u' a)|^2 dudv. \quad (21)$$

The blur estimation problem can now be expressed in terms of a least-squares estimation, in which the image "discrepancy" t(a) is minimised with respect to the blur parameter a. The stationary condition at a minimum is simply $$\partial t/\partial a = 0. \quad (22)$$

However, Equation (21) can be further expanded as:

$$t(a) = \quad (23)$$
$$\iint_R \{|G_2|^2 + |G_1|^2 \cos^2(2\pi u' a) - \cos(2\pi u' a)(G_1 G_2^* + G_1^* G_2)\} dudv.$$

$$t(a) = \quad (24)$$
$$\iint_R \left\{|G_2|^2 + \frac{|G_1|^2}{2}(1 + \cos(4\pi u' a)) - \cos(2\pi u' a)(G_1 G_2^* + G_1^* G_2)\right\} dudv.$$

The blurred images $g_1$ and $g_2$ are real even functions, resulting in the Fourier spectra thereof $G_1$ and $G_2$ having Hermitian symmetry. Hence, the following apply:

$$\left. \begin{array}{l} |G_2| = \text{real, even} \\ |G_2| = \text{real, even} \\ (G_1 G_2^* + G_1^* G_2) = \text{real, even} \end{array} \right\} \quad (25)$$

Equation (24) can be expressed in terms of a complex exponential, because the imaginary sine components identically sum to zero when the symmetry conditions of Equation (25) apply.

$$t(a) = \iint_R \left\{|G_2|^2 + \frac{|G_1|^2}{2} + \frac{|G_1|^2}{2}\exp(4\pi u' a)) - \quad (26) \right.$$
$$\left. \exp(2\pi u' a)(G_1 G_2^* + G_1^* G_2)\right\} dudv.$$

Applying the coordinate transforms of Equation (11), the transformation can be rewritten as:

$$u'a = ua \cos\theta + va \sin\theta \quad (27)$$

The image "discrepancy" t in Equation (26) is a function of two variables, and therefore $t(a,\theta)$ must be minimised with respect to both parameters, a and $\theta$. Since a and $\theta$ have a polar structure, such allows the introduction of two new parameters X and Y with a rectilinear form as follows:

$$\left. \begin{array}{l} a\cos\theta = X \\ a\sin\theta = Y \end{array} \right\} \quad (28)$$

Applying Equation (28) to Equation (26) results in the following:

$$t(a, \theta) = \varepsilon(X, Y) \quad (29)$$

$$= \int_{-\infty}^{\infty}\int_{-\infty}^{\infty} \left[|G_2|^2 + \frac{|G_1|^2}{2}\right] dudv + \quad (30)$$
$$\int_{-\infty}^{\infty}\int_{-\infty}^{\infty} \frac{|G_1|^2}{2}\exp(-4\pi i[uX + vY]) dudv -$$
$$\int_{-\infty}^{\infty}\int_{-\infty}^{\infty} (G_1 G_2^* + G_1^* G_2)\exp(-2\pi i[uX + vY]) dudv$$

The first term in Equation (30) is a constant term related to the total "energy" in the two blurred image signals $g_1$ and $g_2$, which may be ignored in order to minimise the image "discrepancy" t. The second term is the (two-dimensional)

auto-correlation of blurred image $g_1$ which has been scaled by a factor of one half, while it's coordinates have been scaled by two. The third term is the cross-correlation of the blurred images $g_1$ and $g_2$ plus the corresponding 180 degrees rotated form.

Therefore, in the preferred embodiment, the image "discrepancy" t function can be minimised with respect to X and Y by calculating the image "discrepancy" t for all values of X and Y using the Fast Fourier Transform, which is the most efficient way to calculate large kernel correlations If only a small blur is expected, then the correlation calculations can be limited to a small zone, and advantage can be taken of computational efficiencies available. Additional efficiencies are possible using the symmetries apparent in Equation (30).

In another implementation, the exposures or blur functions are chosen to be uniform, to have the same start times, but blur function $b_2$ has twice the duration of blur function $b_1$. FIGS. 4A and 4B illustrate the x' component of the respective blur functions $b_1$ and $b_2$ This corresponds to case (c) above. This particular relationship between the two exposures results in the following parameters:

$$\left.\begin{array}{l} a_1 = a \\ a_2 = 2a \\ x'_0 = a \\ y'_0 = 0 \end{array}\right\} \quad (31)$$

It is noted that these exposures or blur functions $b_1$ and $b_2$ can be synthesised from Case (a) discussed above. The first exposure is just blur function $b_1$, whereas the first and second exposures of FIGS. 2A and 2B can be averaged to synthesise blur function $b_2$ as shown in FIG. 4B.

Applying these parameters to Equations (14) and (15) gives the Fourier spectra:

$$G_1(u, v) = F(u, v) \cdot \frac{\sin(2\pi u' a)}{2\pi u' a} \quad (32)$$

$$G_2(u, v) = F(u, v) \cdot \frac{\sin(4\pi u' a)}{4\pi u' a} \cdot \exp(-2\pi u' a) + N(u, v) \quad (33)$$

From Equations (32) and (33), the noise tern N(u,v) may be expressed as follows:

$$N(u,v) = G_2(u,v) - G_1(u,v).\cos(2\pi u' a).\exp(-2\pi i u' a) \quad (34)$$

Again, the modulus-squared error or "deviation" t can be written as a function of the blur parameter a:

$$t(a) = \int\int_R |N(u, v)|^2 du dv \quad (35)$$

$$= \int\int_R |G_2(u, v) - G_1(u, v) \cdot \cos(2\pi u' a) \cdot \exp(-2\pi i u' a)|^2 du dv.$$

However, Equation (35) can be further expanded as:

$$t(a) = \int\int_R \{|G_2|^2 + |G_1|^2 \cos^2(2\pi u' a)\} du dv - \quad (36)$$

$$\int\int_R (G_2^* G_1 \cdot \exp(-2\pi i u' a) +$$

$$G_1^* G_2 \cdot \exp(2\pi i u' a)) \cdot \cos(2\pi u' a) du dv$$

-continued $$= \int\int_R \left\{|G_2|^2 + \frac{|G_1|^2}{2}\right\} du dv + \quad (37)$$

$$\frac{1}{2}\int\int_R |G_1|^2 \cos(4\pi u' a) du dv -$$

$$\frac{1}{2}\int\int_R (G_2^* G_1 + G_1^* G_2) du dv -$$

$$\frac{1}{2}\int\int_R \{G_2^* G_1 \cdot \exp(-4\pi i u' a) +$$

$$G_1^* G_2 \cdot \exp(4\pi i u' a)\} du dv$$

Applying Equation (28) to Equation (37) results in the following:

$$t(a, \theta) = \varepsilon(X, Y) \quad (38)$$

$$= \int\int_R \left\{|G_2|^2 + \frac{|G_1|^2}{2}\right\} du dv -$$

$$\frac{1}{2}\int\int_R \{G_2^* G_1 + G_1^* G_2\} du dv +$$

$$\frac{1}{2}\int\int_R |G_1|^2 \cos(4\pi [uX + vY]) du dv -$$

$$\frac{1}{2}\int\int_R \{G_2^* G_1 \cdot \exp(-4\pi i[uX + vY]) +$$

$$G_1^* G_2 \cdot \exp(4\pi i[uX + vY])\} du dv.$$

Because the blurred images $g_1$ and $g_2$ are both real functions, the following properties exist:

$$G^*_n(u,v) = G_n(-u,-v) |G_n(-u,-v)| = |G_n(u,v)| \quad (39)$$

The full (or at least symmetrical) limits in frequency space allows the last two terms of Equation (38) to be joined.

$$\varepsilon(X, Y) = \int_{-\infty}^{\infty}\int_{-\infty}^{\infty} \left\{|G_2(u, v)|^2 + \frac{1}{2}|G_1(u, v)|^2\right\} du dv - \quad (40)$$

$$\frac{1}{2}\int_{-\infty}^{\infty}\int_{-\infty}^{\infty} \{G_2^*(u, v) G_1(u, v) +$$

$$G_1^*(u, v) G_2(u, v)\} du dv +$$

$$\frac{1}{2}\int_{-\infty}^{\infty}\int_{-\infty}^{\infty} |G_1(u, v)|^2 \exp(4\pi [uX + vY]) du dv$$

$$\int_{-\infty}^{\infty}\int_{-\infty}^{\infty} G_1(-u, -v) G_2(u, v) \cdot$$

$$\exp(4\pi i [uX + vY]) du dv$$

Only the last two terms of Equation (40) are functions of X and Y. These are therefore the only terms determining where the minimum of the deviation function $\epsilon(X,Y)$ is located, In particular, the last two terms can be recognised as having the form of auto and cross-correlation functions).

$$\frac{1}{2}\int_{-\infty}^{\infty}\int_{-\infty}^{\infty} |G_1(u, v)|^2 \exp(4\pi [uX + vY]) du dv - \quad (41)$$

$$\int_{-\infty}^{\infty}\int_{-\infty}^{\infty} G_1(-u, -v) G_2(u, v) \cdot \exp(4\pi i [uX + vY]) du dv =$$

$$\frac{1}{2}\int_{-\infty}^{\infty}\int_{-\infty}^{\infty} G_1(-u, -v) \cdot \{G_1(-u, -v) - 2G_2(u, v)\} \cdot$$

$$\exp(4\pi i [uX + vY]) du dv$$

Equation (41) represents the convolution of blur image $g_1(-x,-y)$ with the difference of $(g_1-x,-y)$ and $2g_2(x,y)$ evaluated at coordinates (X',Y'), where $$X' = 2X \brace Y' = 2Y \quad (42)$$

Figure 7A:
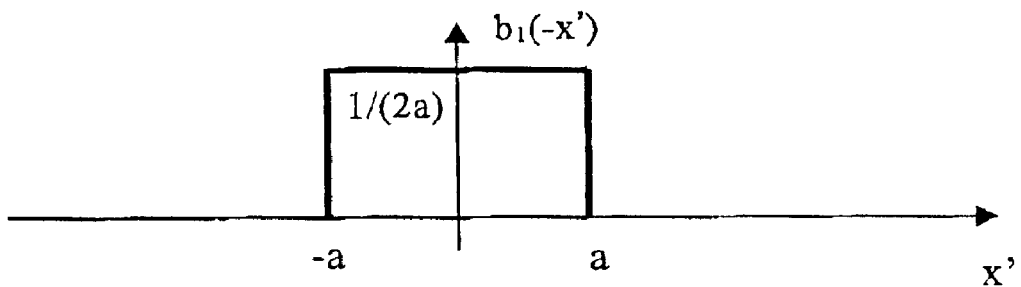
FIGS. 7A and 7B illustrate the x' component of the respective blur functions $b_1(-x')$ and $b_1(-x')-2b_2(x')$, resulting from a linear combination of $b_1$ and $b_2$.
Figure 7B:
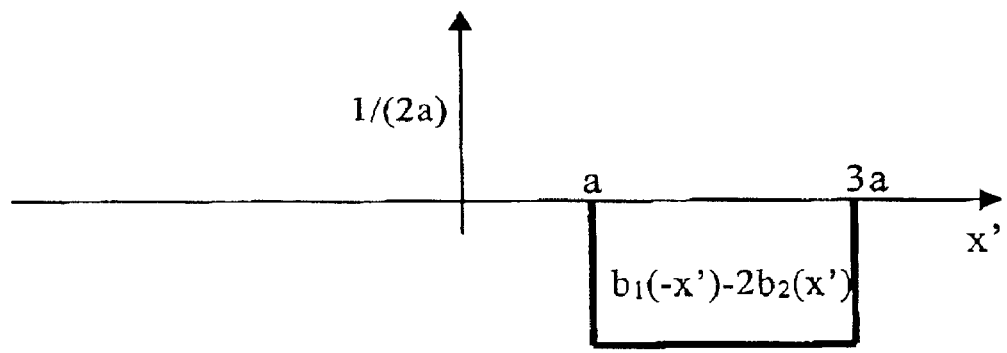

Blur functions having such a result are illustrated in FIGS. 7A and 7B.

A person skilled in the art would recognise that many variations of the above implementations exist. For example, the blur function $b_2$ can be chosen such that its duration comprises multiples of the duration of blur function $b_1$, wherein the multiples are greater than two which correspond with the implementations described above.

By considering implementations with higher durations for blur function $b_2$ relative to the blur function $b_1$, a sequence of auto-correlations and cross-correlations are evaluated with various integer rescaling factors. However, the overall method is similar in that a direct calculation of the minimisation is possible using fast correlation techniques.

In order to illustrate the above, yet another implementation is described. FIGS. 5A and 5B illustrate the x' components of the respective blur functions $b_1$ and $b_2$ resulting from two uniform exposures centred on the same time, but with the one exposure three times the duration of the other. An alternative implementation with the same start time can be analysed in a very similar fashion and will not be explicitly derived.

This particular relationship between the two exposures results in the following parameters:

$$\begin{matrix} a_1 = a \\ a_2 = 3a \\ x'_0 = 0 \\ y'_0 = 0 \end{matrix} \quad (43)$$

Applying the parameters of Equations (43) to Equations (14) and (15) gives the Fourier spectra.

$$G_1(u, v) = F(u, v) \cdot \frac{\sin(2\pi u' a)}{2\pi u' a} \quad (44)$$

$$G_2(u, v) = F(u, v) \cdot \frac{\sin(6\pi u' a)}{6\pi u' a} + N(u, v) \quad (45)$$

Using the following trigonometric expansion:

$$\sin(6\pi u'a) = [4\cos^2(2\pi u'a) - 1]\sin(2\pi u'a) = [2\cos(4\pi u'a) + 1] \sin(2\pi u'a). \quad (46)$$

the following total modulus-squared spectral "deviation" t, integrated over a representative region of the spatial frequency, must be minimised:

$$t(a) = \int\int_R |N(u, v)|^2 du\, dv \quad (47)$$
$$= \int\int_R |G_2(u, v) - G_1(u, v) \cdot \cos(2\pi u' a)|^2 du\, dv.$$

Expanding Equation (47) gives:

$$t(a) = \int\int_R \left\{ |G_2|^2 + \frac{[G_1 G_2^* + G_2 G_1^*][2\cos(4\pi u' a) + 1]}{3} + \frac{|G_1|^2[2\cos(8\pi u' a) + 2\cos(4\pi u' a) + 3)]}{9} \right\} du\, dv \quad (48)$$

Thus, by examining each of the terms above, the blur parameter can be directly estimated, in a manner similar to the previous implementations. Equation (48) includes two cross-correlations rescaled by factor two and two auto-correlations rescaled by factors four and two respectively.

When blur functions are considered with the duration of one of the blur functions a larger integer value of that of the other, the number of rescaled auto and cross-correlations to be evaluated also increase, but otherwise similar relationships exist.

Non-uniform exposures can similarly be used. FIGS. 7A and 7B illustrate yet another implementation wherein the x' components of the respective blur functions $b_1$ and $b_2$ resulting from two non-uniform exposures centred on the same time, but with the one exposure twice the duration of the other. An alternative implementation with the same start time can be analysed in a very similar fashion and will therefore not be explicitly derived.

The typical non-uniform exposure pattern is derived from just one convolution. The method is readily extended to multiple convolutions.

The Fourier spectra in this implementation is as follows:

$$G_1(u, v) = F(u, v) \cdot \left[\frac{\sin(2\pi u' a)}{2\pi u' a}\right]^m \quad (49)$$

$$G_2(u, v) = F(u, v) \cdot \left[\frac{\sin(4\pi u' a)}{4\pi u' a}\right]^m + N(u, v) \quad (50)$$

wherein the integer value m represents the number of times a uniform exposure pattern has to be convolved to produce the required non-uniform exposure pattern. The implementation illustrated in FIGS. 6A and 6B was derived using m=2.

Minimisation needs to be applied to the following total modulus-squared spectral "deviation" t:

$$t(a) = \int\int_R |N(u, v)|^2 du\, dv \quad (51)$$
$$= \int\int_R |G_2(u, v) - G_1(u, v) \cdot \cos^m(2\pi u' a)|^2 du\, dv.$$

Using similar argument to those in previous implementations, Equation (51) will, in general, expand into a series of auto and cross-correlation with various integer rescaling factors:

$$t(a) = \int\int_R \{|G_2|^2 + |G_1|^2 \cos^{2m}(2\pi u' a)\} du\, dv - \int\int_R (G_2^* G_1 + G_1^* G_2) \cos^m(2\pi u' a) du\, dv. \quad (52)$$

Using m=2 gives:

$$t(a) = \int\int_R \left\{|G_2|^2 + \frac{|G_1|^2[\cos(8\pi u'a) + 4\cos(4\pi u'a) + 3]}{8}\right\} \quad (53)$$

-continued $$dudv - \int\int_R \left\{\frac{(G_2^*G_1 + G_1^*G_2)[\cos(4\pi u'a) + 1]}{2}\right\} dudv.$$

Specifically in this the case with m=2, from Equation (53), the cross-correlation is rescaled by a factor of two, and the auto-correlation rescaled by factors of two and four.

The foregoing provide direct computational methods for estimating blur parameters over an infinite plane. For general implementation, the algorithms are desirably modified for use with finite and discrete datasets typical of digitally sample images. The computation may be modified to work over regions, typically rectangular blocks of pixels, which are significantly larger than the blur parameter sought to be estimated, yet small enough so that the blur parameter remains substantially constant over the region. Also, edge effects which are not present in the infinite plane, may be mitigated by suitable image padding and windowing methods. These constraints are typical of other correlation-based image analysis techniques and consequently need not be discussed further herein.

It follows from the foregoing that where two images are captured in direct association, either overlapping, immediately adjacent or closely adjacent with respect to capture time, and assuming linear motion over each area of interest, the blur in either image may be determined.

The present inventors have realised that where more than one image can be captured within a field or frame period, motion blur may therefore be estimated for at least that field or frame. Thus, motion vectors may be obtained from multiple sub-field or sub-frame images, thereby improving motion vector accuracy and associating such vectors with a single (traditional) field or frame image, as opposed to a pair of such traditional images. In this fashion, the motion vector obtained much more accurately represents the motion that occurred during the capture of the respective image, as opposed to the motion that occurred between capture of adjacent traditional field/frame images.

Figure 8:
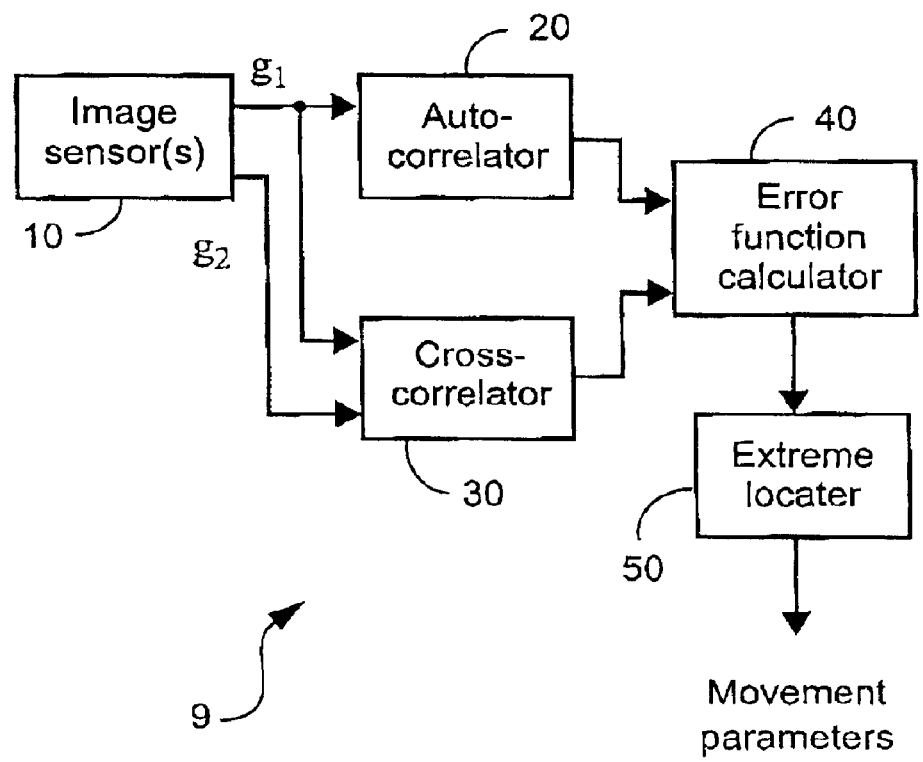
FIG. 8 is a schematic block diagram of an apparatus for blur estimation.

FIG. 8 illustrates a block diagram of apparatus 9 for estimating the blur parameters of blurred images $g_1$ and $g_2$. The apparatus 9 has one or more image sensors 10 for capturing the blurred images $g_1$ and $g_2$, a plurality of correlators 20 and 30 for performing auto-correlation of the blurred image $g_1$ and cross-correlation between the two images $g_1$ and $g_2$ respectively, and an error function calculator 40 for evaluating an error function t over all possible displacements using the results from the correlators 20 and 30. The apparatus 9 further includes an extreme locater 50 for finding the displacement with the minimum value for the error function t.

In a first arrangement, two image sensors 10 are used for capturing the blurred images $g_1$ and $g_2$ respectively. The image sensors 10 are arranged to view the matching co-ordinated of the image signal $f(x,y)$. Their respective spatial extents $2a_1$ and $2a_2$, are controlled by controlling their relative exposure times. The offset $(x_0,y_0)$ is controlled by controlling the time of exposure.

Figure 9:
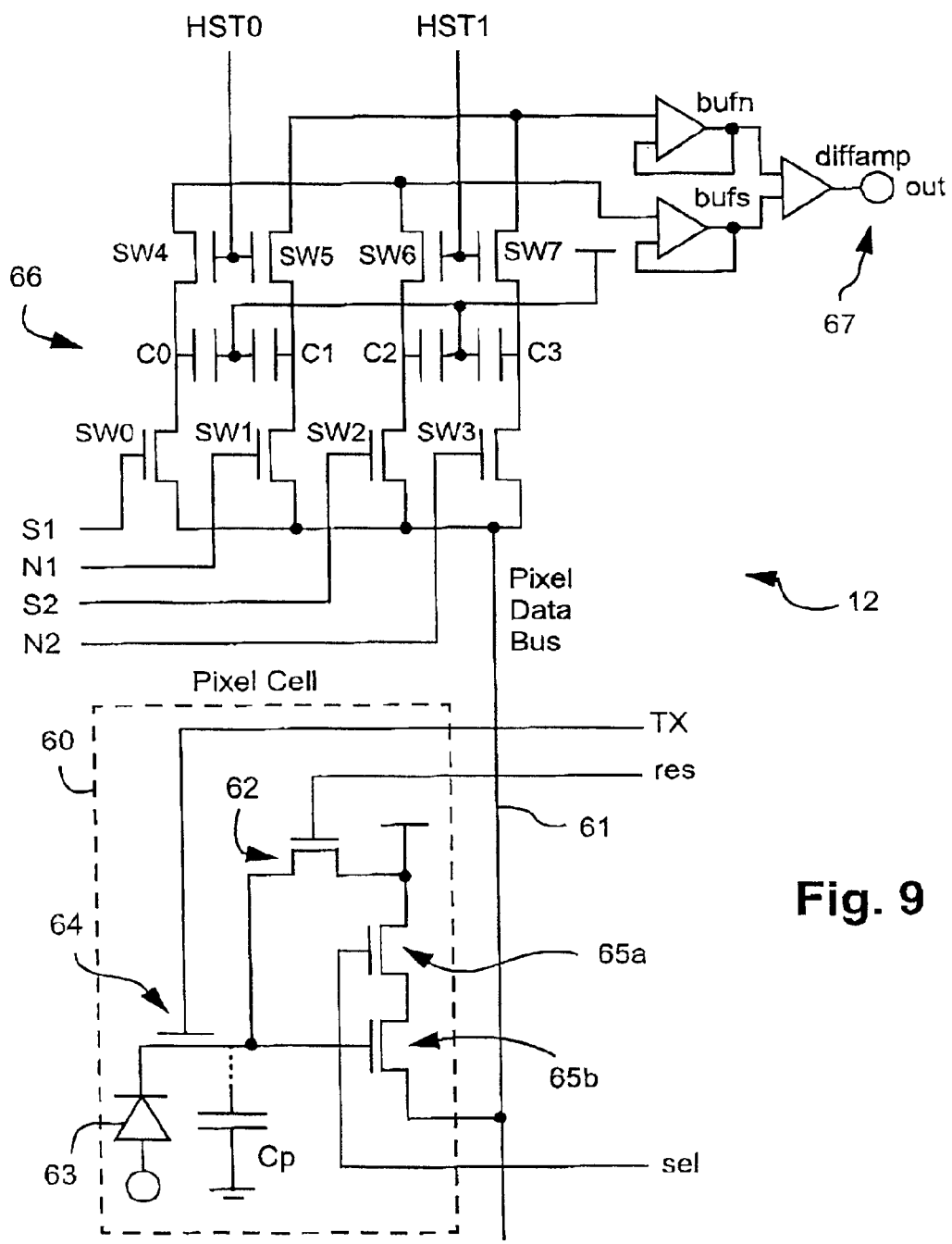
FIG. 9 is a schematic block diagram of a structure of a CMOS sensor that may be used to capture blurred images $g_1$ and $g_2$.

In an alternative arrangement, a single image sensor 10 is used, implemented with CMOS technology. The operation of this image sensor 10, will be further explained with references to FIGS. 9 and 10. FIG. 9 shows a circuit layout of a part 12 of the image sensor 10, the part 12 being arranged to capture a single pixel of the digital image signal $f(x,y)$ by means of a pixel cell 60.

The pixel cell 60 is formed of a photodiode 63 which acts as an image pixel sensor and which connects to a transistor 64 to discharge a parasitic capacitor Cp according to the intensity of illumination falling upon the photodiode 63. The parasitic capacitor Cp may be formed by a floating diffusion. A transistor switch 62, operated by a reset signal 'res', acts to reset the capacitor Cp by applying a supply rail potential to the capacitor Cp. A signal "TX" is applied to the parasitic capacitor Cp enabling the capacitor Cp to discharge through the operation of the photodiode 63. It will be appreciated therefore that the sensor 10 operates according to negative logic principles where the charge on the capacitor Cp is the inverse of the light intensity-duration function applied to the photodiode 63. A select signal 'sel' operates a transistor switch 65a which, together with a source-follower transistor 65b, couples the voltage on the parasitic capacitor Cp to a pixel data bus 61. The duration that the signal 'TX' is applied is usually called the exposure time, and the charge of the parasitic capacitor Cp is the value of the pixel cell 60. A number of the pixel cells 60 may be connected to the pixel data bus 61.

In order to provide a sequence of output pixel values of an image, a switching arrangement 66 is provided to couple such values to an output 67 of the part 12. The sequence may, for example, be a raster sequence.

Signals "N1" and "N2" are applied to transistor switches SW1 and SW3, causing them to conduct, thereby providing for noise charge values to be stored on capacitors C1 and C3 respectively. Such noise values are representative of circuit noise and are available on the pixel data bus 61 when the 'sel' signal of each of the cells 60 connected to the bus 61 are all disabled or riot selected.

Signals 'S1' and 'S2' are applied to turn ON switches SW0 or SW2 respectively, so that capacitors C0 and C2 are selectively charged according to the pixel value as present on the pixel bus 61.

Signals 'HST0' and 'HST1' are applied to turn ON switch pairs SW4 and SW5, and SW6 and SW7 respectively. The switches SW5 and SW7 act to couple the noise values on the capacitors C1 and C3 respectively to a buffer 'bufn', while the pixel values present on the capacitors C0 and C2 are coupled via operation of the switches SW4 and SW6 respectively to a buffer 'bufs'. A differential amplifier 'diffamp', connected to the buffers 'bufn' and 'bufs', finds the difference between the two signals to output a signal indicative of the light fallen upon the photodiode 63.

Figure 10:
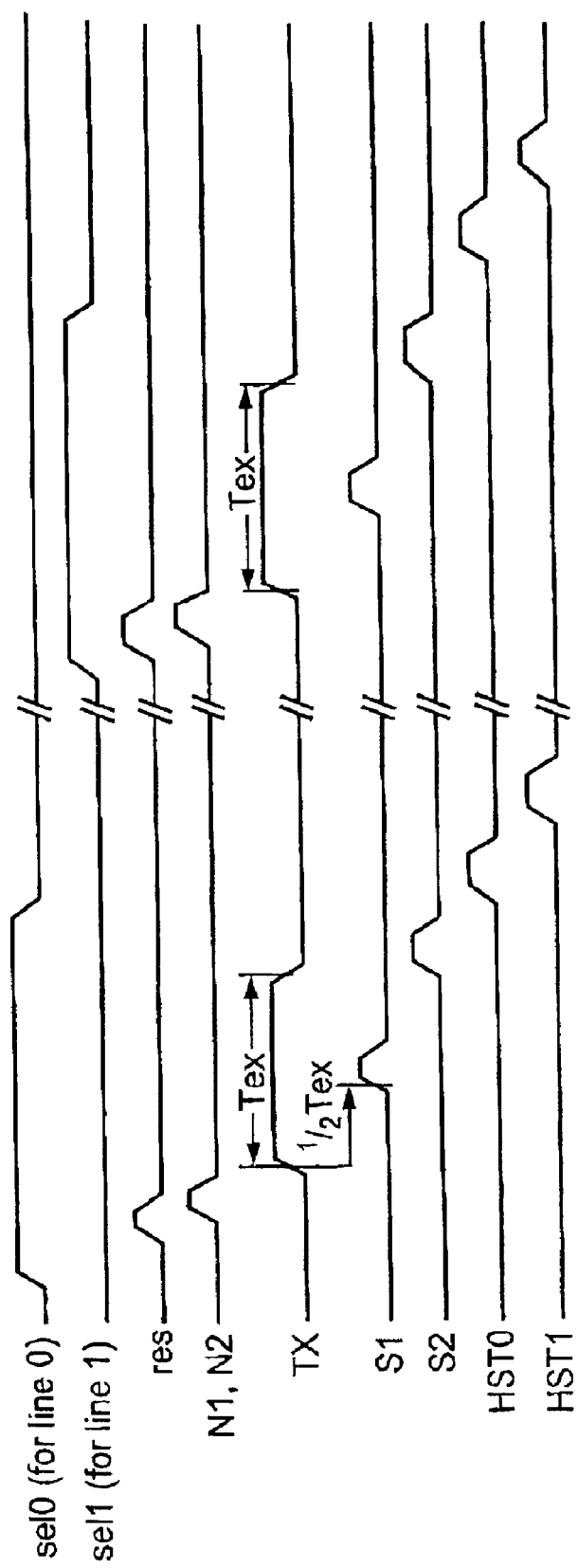
FIG. 10 is a timing sequence to be used with the CMOS sensor of FIG. 9 to capture the two overlapping blurred images $g_1$ and $g_2$.

By forming the image sensor 10 as a matrix of pixel cells 60 formed in rows (lines) and columns, overlapped double sampling of an image that gives rise to blur functions illustrated in FIGS. 4A and 4B, can be achieved using the circuit 12 of FIG. 9 by applying to the circuit 12 a signal sequence as shown in FIG. 10.

When a signal 'sel0' is asserted, all the pixel cells 60 in row 0 of the matrix are enabled, and each drive a corresponding pixel data bus 61 in the corresponding column.

The signal 'res' is then asserted, causing all the pixel cells 60 in line 0 to be reset, and leaving each cell 60 driving a noise value on the corresponding pixel data bus 61.

As the signal 'res' is de-asserted, the signals 'N1' and 'N2' are then asserted to latch the noise values into capacitors C1 and C3. The signal 'TX' is then asserted for a period 'Tex'. During the period 'Tex', all the pixel cells 60 in line 0 discharge their corresponding parasitic capacitors Cp according to the light intensity on line 0. The signal 'S1' is asserted in the middle of the exposure time to store the pixel values at that time in the respective capacitors C0. At the end of the exposure time 'Tex', the pixel values at that time are stored in capacitors C2 by asserting signal 'S2'. The signal 'HST0' is then asserted to switch on SW4 and SW5 to find the true values of the pixels during the first half of exposure time 'Tex' The signal 'HST1' is asserted to switch on SW6 and SW7 to find the true values of the pixels during the second half of exposure time 'Tex'. The signals 'HST0' and 'HST1' are asserted progressively along line 0 for each pixel to output a sequence of pixel values for the line. This is repeated until all the pixels in line 0 are read.

Such a mode of operation results ill a pixel sequence as follows, for n pixels in the line:

Pixel_1_half, Pixel_1_full, Pixel_2_half, Pixel_2_full, . . . Pixel_n_full.

A next line (line 1) is selected by asserting 'sel1', and the above is repeated.

Alternatively, the mode of operation may be altered to provide the following sequence:

Pixel_1_half, Pixel-2_half . . . Pixel_n_half, Pixel 1_full, Pixel 2_ full, . . . Pixel_n_full.

It will be apparent from the forgoing that where S1 is activated at the middle of TX and S2 at the end, the first image obtained by virtue of S1, for a stationary target which presents no blur, will have half the intensity of the second image obtained at S2. As such, any image derived at S1 will include, for all intents and purposes, the same components of the image obtained at S2. This is to be contrasted with prior art arrangements where single frames or fields are captured one after the other in which case the entire sensor reset and newly illuminated.

As is apparent from the signal sequence shown in FIG. 10, and in particular from the select signals sel0 and sel1, there is a delay between capture of pixel values of line 0, which corresponds to a first row, and capture of pixel values of each of the subsequent rows. If the motion is substantially horizontal, then the method described above may be employed without any modifications. As it is assumed that the motion is lineal and uniform, each line is subjected to the same blur function $b_1$ and $b_2$. Even though the The circuit 12 of FIG. 9 is arranged to provide two images $g_1$ and $g_2$ with the same start time. In order to capture two overlapping images $g_1$ and $g_2$ with the different start times, such as those shown in FIGS. 3A and 3B, or 5A and 5B, minor modifications to the circuit 12 is needed, in that the switching arrangement 66 has to be expanded to store three values, as would be apparent to those skilled in the art from the above description.

Figure 11:
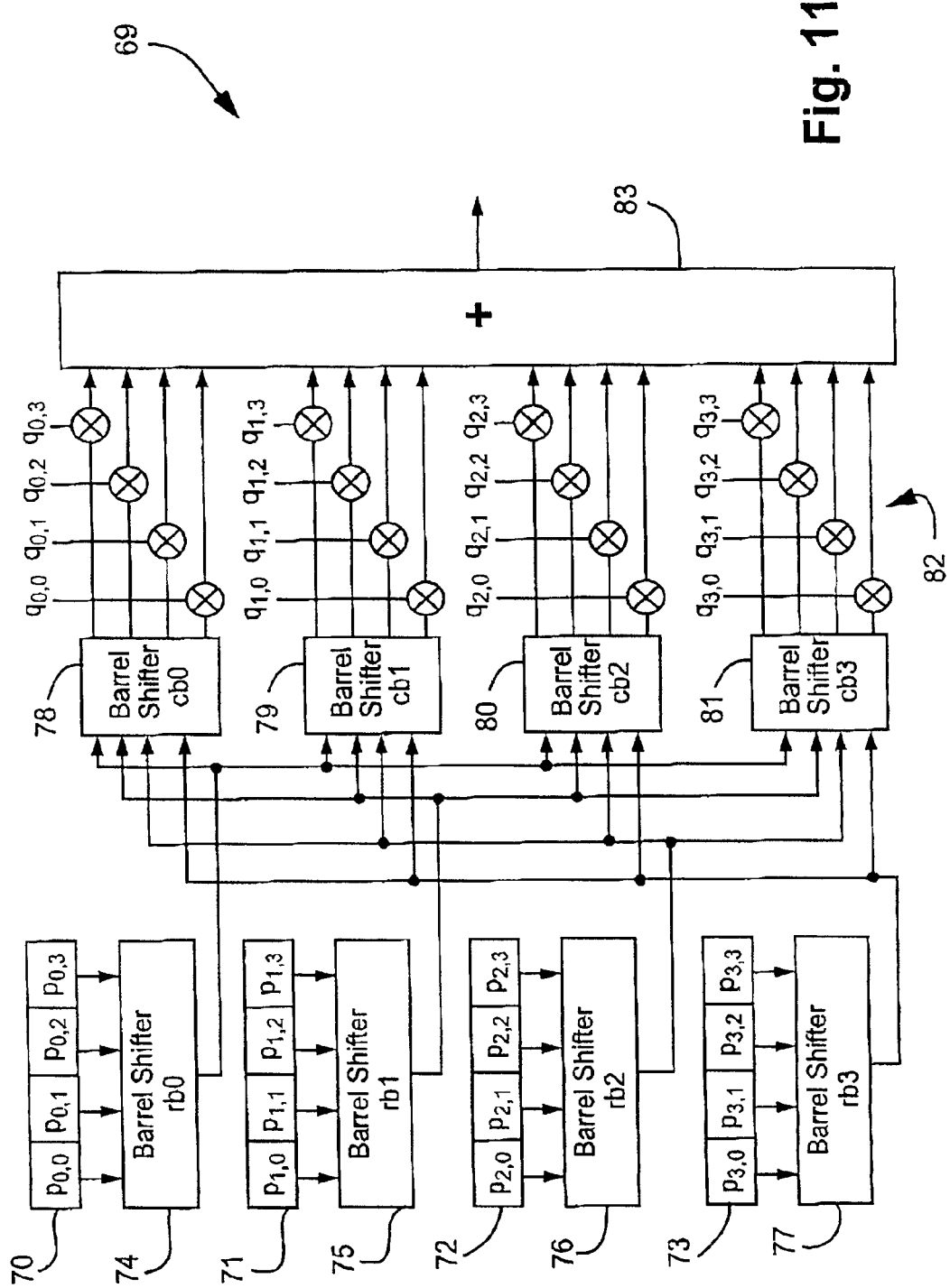
FIG. 11 is a schematic block diagram of an embodiment of a correlator that may be used in the apparatus of FIG. 8 for blur estimation.

FIG. 11 shows one implementation of a circuit 69 for use as part of the correlator 20 or the correlator 30. In this implementation, the circuit 69 has registers 70 to 73 for holding the pixel data of a first image p to be correlated and one cyclic barrel shifter 74 to 77 for each row. The cyclic barrel shifters 74 to 77 rotate the pixel data to perform the convolution. The circuit 69 also has one cyclic barrel shifter 78 to 81 for each column to rotate the pixel data from the row barrel shifters 74 to 77. The barrel shifters 78 to 81 output to corresponding groups of multipliers 82 for multiplying the rearranged pixel data with pixel data from another image source q, and an adder 83 for adding the products from the multipliers 82 together. When the circuit 69 is used as the auto-correlator 20 of FIG. 8, the input images p and q are derived from the same input image source. Although not shown in FIG. 11, the q input may be deposited into registers in a manner akin to the p input, thereby enabling correction for any timing issues.

The circuit 69 commences operation by shifting into the registers 70 to 73 the pixel data from the image p. After the whole image p is shifted in, the barrel shifters 74 to 77 are configured to rearrange the pixel data of image p to calculate various correlation values. In the situation where the barrel shifters 74 to 77 are not shifting its input p, the correlator calculates $(p \circ q)(0,0)$. With the row barrel shifters 74 to 77 shifted one position to the right, and the column barrel shifters 78 to S1 not shifted, the circuit 69 calculates $(p \circ q)(0,1)$, which is the same as $(p \circ q)(0,N-1)$, with N being the number of rows in the images p and q. When the row shifters 74 to 77 are not shifting their input p, and the column shifters 78 to 81 are shifting their input q by k positions to the right, then the circuit 69 calculates both $(p \circ q)(k,0)$ and $(p \circ q)(M-k,0)$, with M being the number of column in the images p and q.

In terms of hardware, for images of dimension M×N pixel cells 60, this implementation of the circuit 69 requires:

2×M×N registers to hold all the pixel values of the two images p and q;

M N-input row barrel shifters to shift the pixel values in the rows;

N M-input column barrel shifters to shift the outputs from the row barrel shifters;

M×N multipliers to multiply the rearranged pixel values of one image p with pixel values from the other image q;

M×(N−1) 2-input adders (or a single M×N input adder) to add the products of the multipliers; and barrel shifter control logic.

Figure 12:
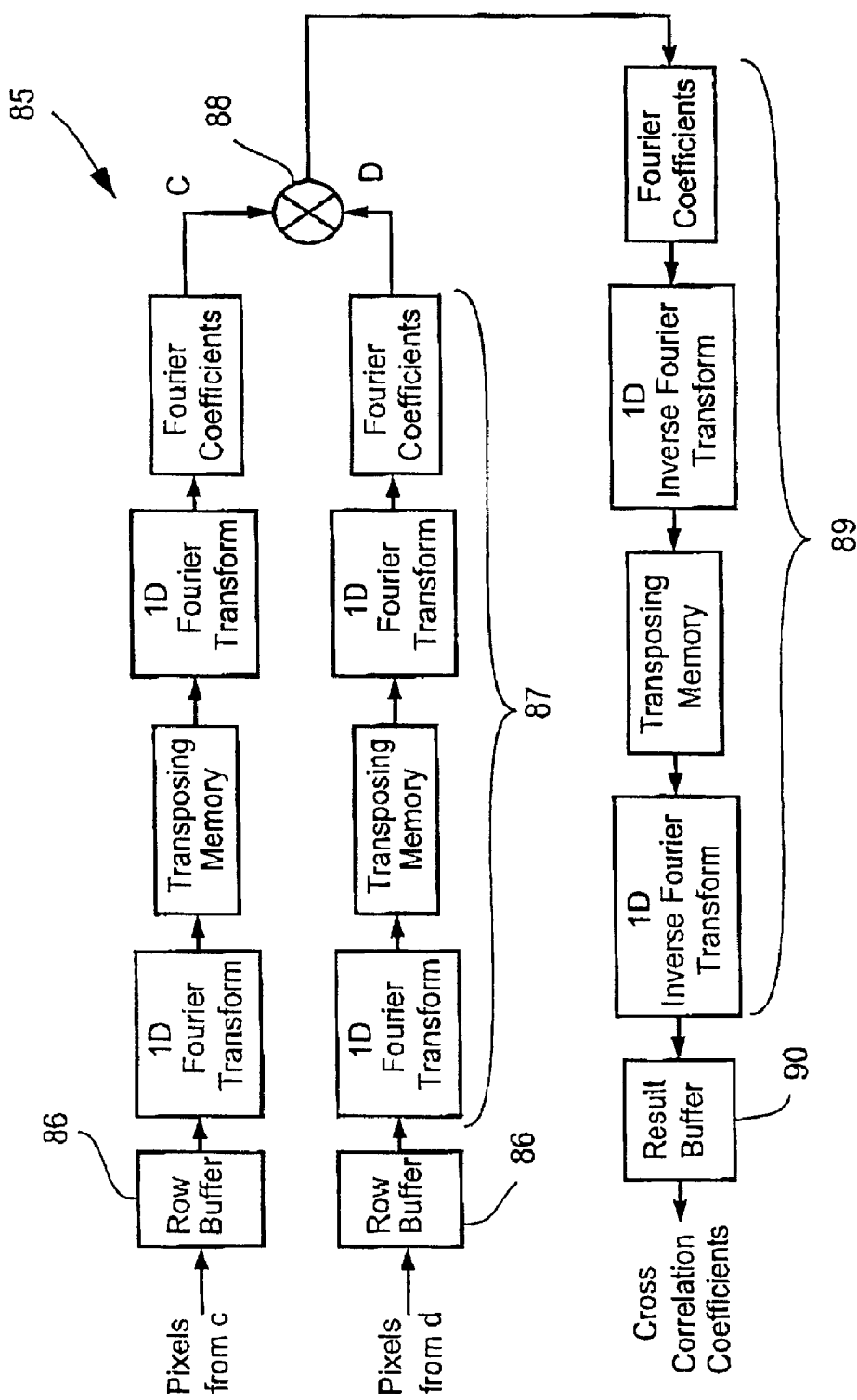
FIG. 12 is a schematic block diagram of another embodiment of a correlator that may be used in the apparatus of FIG. 8 for blur estimation.

FIG. 12 shows a second implementation of a correlator circuit 85. This implementation uses Fourier Transforms to calculate correlations between images c and d. Using the correlation theorem, $$c(x,y) \circ d(x,y) \Leftrightarrow C^*(u,v)D(u,v) \qquad (54)$$

the cross-correlation of the two images c and d can be calculated by inputting pixels from the images c and d into respective row buffers 86. A Fourier transform 87 is then performed on both images c and d to obtain their Fourier coefficients C and D. The coefficients are multiplied 88 on a one by one basis and an inverse Fourier transform 89 is performed on the output of the multiplier 88. The results of the inverse transform 89 comprise cross correlation coefficients that are retained in a result buffer. Again, for an autocorrelator implementation, the inputs c and d are connected to the same image input.

The implementation of the 1-dimensional Fourier transform and inverse Fourier transform blocks are well known to persons in the art.

In terms of hardware, to correlate two images c and d of dimension M×N, the arrangement 85 of FIG. 12 requires:

two N-pixel buffers to store one row of the incoming data;

two blocks of logic performing 1-dimensional Fourier transform on the row of N pixels. The amount of logic required may be determined from the value of N, two blocks of logic performing 1-dimensional Fourier transform on the row of M coefficients. The amount of logic required may be determined from the value of M;

three transposing memories to hold M×N pixel values/coefficients;

three memory blocks to hold M×N Fourier coefficients, two for the input of the multiplier and one for the product;

one block of logic performing 1-dimensional inverse Fourier transform on M coefficients;

one block of logic performing 1-dimensional inverse Fourier transform on N coefficients; and one N-entry buffer to hold one row of the correlation coefficients.

The error function calculator 40 of FIG. 8 receives the correlation results from the correlators 20 and 30 and calculates the error values based on the foregoing equations derived above. The error calculator 40 may be formed in hardware by an appropriate combination of adders and multipliers and associated logic, or alternatively implemented in software.

The evaluation of the error function for every point in the domain of the correlation function provides identification of two minima in the error function, one opposite to the other with respect to the origin. Either one of these minima can indicate the displacement (blur) between the two images. To find these minima, all the error function values are searched for the smallest error function value, and the displacement that result in the minima are recorded This takes M×N clock cycles, where M is the number of rows (lines) in the image and N is the number of columns in the image.

However, to increase the accuracy in the estimation, the true minimum in sub-pixel precision can be found. A typical method used is curve fitting, which is a method well known to people skilled in the art.

Before the implementation of such an extreme locater is considered, the theory behind the extreme locator will be examined. Consider for example a (2n+1)×(2n+1) neighbourhood around pixel (x,y) wherein the neighbourhood is defined by all the pixels in a square with corners at (x−n, y−n), (x−n,y+n), (x+n,y+n) and (x+n,y−n). Typically n=1 or 2. A quadratic surface can be fitted locally around the minimum, after which a location of a best-fit surface minimum is calculated. This is effectively interpolation of the minimum position.

A second order surface can be expressed as:

$$P(x,y) = a_{00} + a_{10}x + a_{01}y + a_{11}xy + a_{20}x^2 + a_{02}y^2 \tag{55}$$

which represents a local region with an elliptical paraboloid of arbitrary orientation and axes. A 'least squares fit' is applied to the function $f(x,y)$ on a discrete grid of points:

$$\left. \begin{array}{l} x = m\Delta \\ y = n\Delta \end{array} \right\} \tag{56}$$

expressed as:

$$E = \sum_{n=-N}^{N} \sum_{m=-M}^{M} [f(m\Delta, n\Delta) - P(m\Delta, n\Delta)]^2 \tag{57}$$

Stationary points for all values of k and l are found by:

$$\frac{\partial E}{\partial a_{kl}} = \sum_{n=-N}^{N} \sum_{m=-M}^{M} (m\Delta)^k (n\Delta)^l [f(m\Delta, n\Delta) - P(m\Delta, n\Delta)] = 0 \tag{58}$$

Six simultaneous equations can be derived. Typically M=N=1 or 2.

$$\sum_n \sum_m m^k n^l f_{m,n} = \sum_n \sum_m m^k n^l P_{m,n} \tag{59}$$

Equation (59) is expanded into:

$$\begin{pmatrix} \sum_n \sum_m f_{m,n} \\ \sum_n \sum_m m f_{m,n} \\ \sum_n \sum_m n f_{m,n} \\ \sum_n \sum_m m^2 f_{m,n} \\ \sum_n \sum_m mn f_{m,n} \\ \sum_n \sum_m n^2 f_{m,n} \end{pmatrix} = \begin{pmatrix} \sum\sum 1 & \sum\sum m & \sum\sum n & \sum\sum m^2 & \sum\sum mn & \sum\sum n^2 \\ \sum\sum m & \sum\sum m^2 & \sum\sum mn & \sum\sum m^3 & \sum\sum m^2 n & \sum\sum mn^2 \\ \sum\sum n & \sum\sum mn & \sum\sum n^2 & \sum\sum m^2 n & \sum\sum mn^2 & \sum\sum n^3 \\ \sum\sum m^2 & \sum\sum m^3 & \sum\sum m^2 n & \sum\sum m^4 & \sum\sum m^3 n & \sum\sum m^2 n^2 \\ \sum\sum mn & \sum\sum m^2 n & \sum\sum mn^2 & \sum\sum m^3 n & \sum\sum m^2 n^2 & \sum\sum m n^3 \\ \sum\sum n^2 & \sum\sum mn^2 & \sum\sum n^3 & \sum\sum m^2 n^2 & \sum\sum mn^3 & \sum\sum n^4 \end{pmatrix} \cdot \begin{pmatrix} a_{00} \\ a_{10} \\ a_{01} \\ a_{20} \\ a_{11} \\ a_{02} \end{pmatrix} \tag{60}$$

It is noted that the square matrix in Equation (60) can be greatly simplified if the chosen polynomials are orthogonal over the discrete range chosen. However, in this case they are not quite orthogonal, but all odd summations do cancel out. Therefore:

$$\begin{pmatrix} \sum_n \sum_m f_{m,n} \\ \sum_n \sum_m m f_{m,n} \\ \sum_n \sum_m n f_{m,n} \\ \sum_n \sum_m m^2 f_{m,n} \\ \sum_n \sum_m mn f_{m,n} \\ \sum_n \sum_m n^2 f_{m,n} \end{pmatrix} = \begin{pmatrix} \sum_n \sum_m 1 & 0 & 0 & \sum_n \sum_m m^2 & 0 & \sum_n \sum_m n^2 \\ 0 & \sum_n \sum_m m^2 & 0 & 0 & 0 & 0 \\ 0 & 0 & \sum_n \sum_m n^2 & 0 & 0 & 0 \\ \sum_n \sum_m m^2 & 0 & 0 & \sum_n \sum_m m^4 & 0 & 0 \\ 0 & 0 & 0 & 0 & \sum_n \sum_m m^2 n^2 & \sum_n \sum_m m^2 n^2 \\ \sum_n \sum_m n^2 & 0 & 0 & \sum_n \sum_m m^2 n^2 & 0 & \sum_n \sum_m n^4 \end{pmatrix} \cdot \begin{pmatrix} a_{00} \\ a_{10} \\ a_{01} \\ a_{20} \\ a_{11} \\ a_{02} \end{pmatrix} \quad (61)$$

Equation (61) is further simplified using the known relationships:

$$A = B \cdot C \quad (62)$$

and $$B^{-1} A = C \quad (63)$$

The dominant diagonal in matrix B simplifies the calculation of the matrix inversion $B^{-1}$.

Differentiation of Equation (64) results in:

$$\left. \begin{array}{l} \frac{\partial P}{\partial x} = a_{10} + a_{11} y + 2 a_{20} x = 0 \\ \frac{\partial P}{\partial y} = a_{01} + a_{11} x + 2 a_{02} y = 0 \end{array} \right\} \quad (64)$$

Equation (64) can explicitly be rewritten for the location of the extreme $(x_0, y_0) = (m_0 \Delta, n_0 \Delta)$ as;

$$x_0 = \frac{a_{10}(2 a_{02} - a_{11})}{a_{11}^2 - 4 a_{20} a_{02}} \text{ and } y_0 = \frac{a_{01}(2 a_{20} - a_{11})}{a_{11}^2 - 4 a_{20} a_{02}} \quad (65)$$

For M=N=1, the components of matrix B are:

$$\sum_{n=-1}^{1} \sum_{m=-1}^{1} 1 = 9 \quad (66)$$

$$\sum_{n=-1}^{1} \sum_{m=-1}^{1} n^2 = \sum_{n=-1}^{1} \sum_{m=-1}^{1} m^2 = 6$$

$$\sum_{n=-1}^{1} \sum_{m=-1}^{1} n^2 m^2 = 4$$

$$\sum_{n=-1}^{1} \sum_{m=-1}^{1} n^4 = \sum_{n=-1}^{1} \sum_{m=-1}^{1} m^4 = 6$$

Similarly, for M=N=2 the components of matrix B are calculated as:

$$\sum_{n=-2}^{2} \sum_{m=-2}^{2} 1 = 25 \quad (67)$$

-continued $$\sum_{n=-2}^{2} \sum_{m=-2}^{2} n^2 = \sum_{n=-2}^{2} \sum_{m=-2}^{2} m^2 = 50$$

$$\sum_{n=-2}^{2} \sum_{m=-2}^{2} n^2 m^2 = 100$$

$$\sum_{n=-2}^{2} \sum_{m=-2}^{2} n^4 = \sum_{n=-2}^{2} \sum_{m=-2}^{2} m^4 = 170$$

The linear summations of the sampled function (matrix A in Equation (62)) can now be calculated.

$$\begin{pmatrix} \sum_n \sum_m f_{m,n} \\ \sum_n \sum_m m f_{m,n} \\ \sum_n \sum_m n f_{m,n} \\ \sum_n \sum_m m^2 f_{m,n} \\ \sum_n \sum_m mn f_{m,n} \\ \sum_n \sum_m n^2 f_{m,n} \end{pmatrix} \quad (68)$$

Explicitly, Equation (61) can be written as follows for the 3×3 neighbourhood (M=N=1):

$$\begin{pmatrix} \sum_n \sum_m f_{m,n} \\ \sum_n \sum_m m f_{m,n} \\ \sum_n \sum_m n f_{m,n} \\ \sum_n \sum_m m^2 f_{m,n} \\ \sum_n \sum_m mn f_{m,n} \\ \sum_n \sum_m n^2 f_{m,n} \end{pmatrix} = \begin{pmatrix} 9 & 0 & 0 & 6 & 0 & 6 \\ 0 & 6 & 0 & 0 & 0 & 0 \\ 0 & 0 & 6 & 0 & 0 & 0 \\ 6 & 0 & 0 & 6 & 0 & 0 \\ 0 & 0 & 0 & 0 & 4 & 4 \\ 6 & 0 & 0 & 4 & 0 & 6 \end{pmatrix} \cdot \begin{pmatrix} a_{00} \\ a_{10} \\ a_{01} \\ a_{20} \\ a_{11} \\ a_{02} \end{pmatrix} \quad (69)$$

and matrix inversion of Equation (69) gives:

$$\begin{pmatrix} a_{00} \\ a_{10} \\ a_{01} \\ a_{20} \\ a_{11} \\ a_{02} \end{pmatrix} = \frac{1}{12} \begin{pmatrix} 12 & 0 & 0 & -4 & 0 & -12 \\ 0 & 2 & 0 & 0 & 0 & 0 \\ 0 & 0 & 2 & 0 & 0 & 0 \\ -12 & 0 & 0 & 6 & 0 & 12 \\ 4 & 0 & 0 & 0 & 3 & -6 \\ -4 & 0 & 0 & 0 & 0 & 6 \end{pmatrix} \begin{pmatrix} \sum_n \sum_m f_{m,n} \\ \sum_n \sum_m m f_{m,n} \\ \sum_n \sum_m n f_{m,n} \\ \sum_n \sum_m m^2 f_{m,n} \\ \sum_n \sum_m mn f_{m,n} \\ \sum_n \sum_m n^2 f_{m,n} \end{pmatrix} \quad (70)$$

Figure 13:
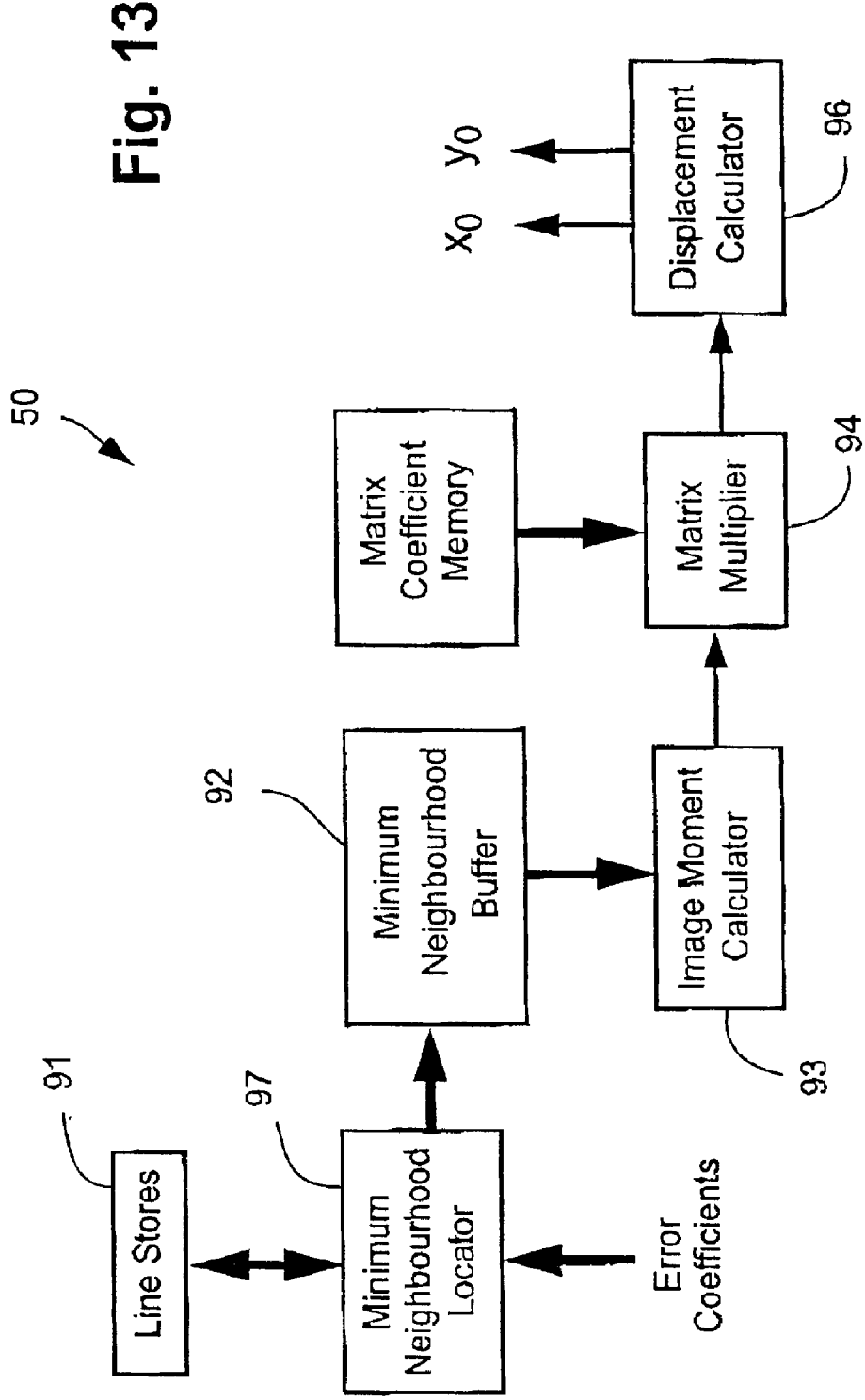
FIG. 13 is a schematic block diagram of an embodiment of a extreme locater that may be used in the apparatus of FIG. 8 for blur estimation.

Given the foregoing, curve fitting may be used to locate the extremes of the error function. An implementation of an implementation of an extreme locater 50 operating using the curve fitting method is shown in FIG. 13.

A minimum neighbourhood locater 97 finds the smallest one of the error coefficients output from the error function calculator 40. The minimum neighbourhood locater 90 further stores the coefficients in a number of line stores 91 (which preferably holds between 3 and 5 lines). When a new minimum is located, the locator 97 writes the 3×3 or 5×5 coefficients surrounding the minimum to a Minimum Neighbourhood buffer 92.

The buffer 92 outputs to an image moment calculator 93 which calculates the following terms:

$$\begin{pmatrix} \sum_n \sum_m f_{m,n} \\ \sum_n \sum_m m f_{m,n} \\ \sum_n \sum_m n f_{m,n} \\ \sum_n \sum_m m^2 f_{m,n} \\ \sum_n \sum_m mn f_{m,n} \\ \sum_n \sum_m n^2 f_{m,n} \end{pmatrix} \quad (71)$$

which are seen as one primary component of Equation (70).

A matrix multiplier 94 multiplies the terms of equation (71) with the known matrix coefficients derived from Equation (66) or (67), and which are stored in a matrix coefficients memory 95. The coefficients $a_{00}$, $a_{10}$, $a_{01}$, $a_{20}$, $a_{11}$, and $a_{02}$ can then be calculated using Equation (70).

A displacement calculator 96 accepts the outputs of the matrix multiplier 94 and implements Equation (39) (reproduced below) using adders, multipliers and dividers to implement the desired functions:

$$x_0 = \frac{a_{10}(2a_{02} - a_{11})}{a_{11}^2 - 4a_{20}a_{02}} \text{ and } y_0 = \frac{a_{01}(2a_{20} - a_{11})}{a_{11}^2 - 4a_{20}a_{02}} \quad (65)$$

The outputs of the displacement calculator 96 are the horizontal and vertical displacements $(x_o, y_o)$ of the input images $g_1$ and $g_2$ of FIG. 8 in relation to each other. The horizontal and vertical displacements $(x_o, y_o)$ are then supplied to subsequent devices as a motion vector of the block of images $g_1$ and $g_2$. The motion vector may be applied or utilized as required to perform a variety of functions, such as those traditionally associated with motion vectors.

Once the blur parameters have been estimated from the two sub-frame images, a new, de-blurred image may be generated. This will not be required for typical video image sequences, because the sub-frame blur will be much smaller than the inter-frame movement blur. However, if a still image with minimal motion blur is required, then various de-convolution methods may be used to generate such an image. Such methods can utilise the estimated blur parameters to obtain a direct solution. Alternatively, iterative methods may be used with a first iteration using the estimated blur parameters to accelerate convergence.

Accordingly, by utilizing sub-frame or sub-field sampling of an image through the arrangement of FIG. 9, it is thus possible to obtain a motion vector from the equivalent of single prior art image sample. Thus the described implementation provides for an estimation of motion blur for each traditional image capture, be it a frame or an interlaced field.

Figures 14A, 14B, 14C, 14D, 14E:
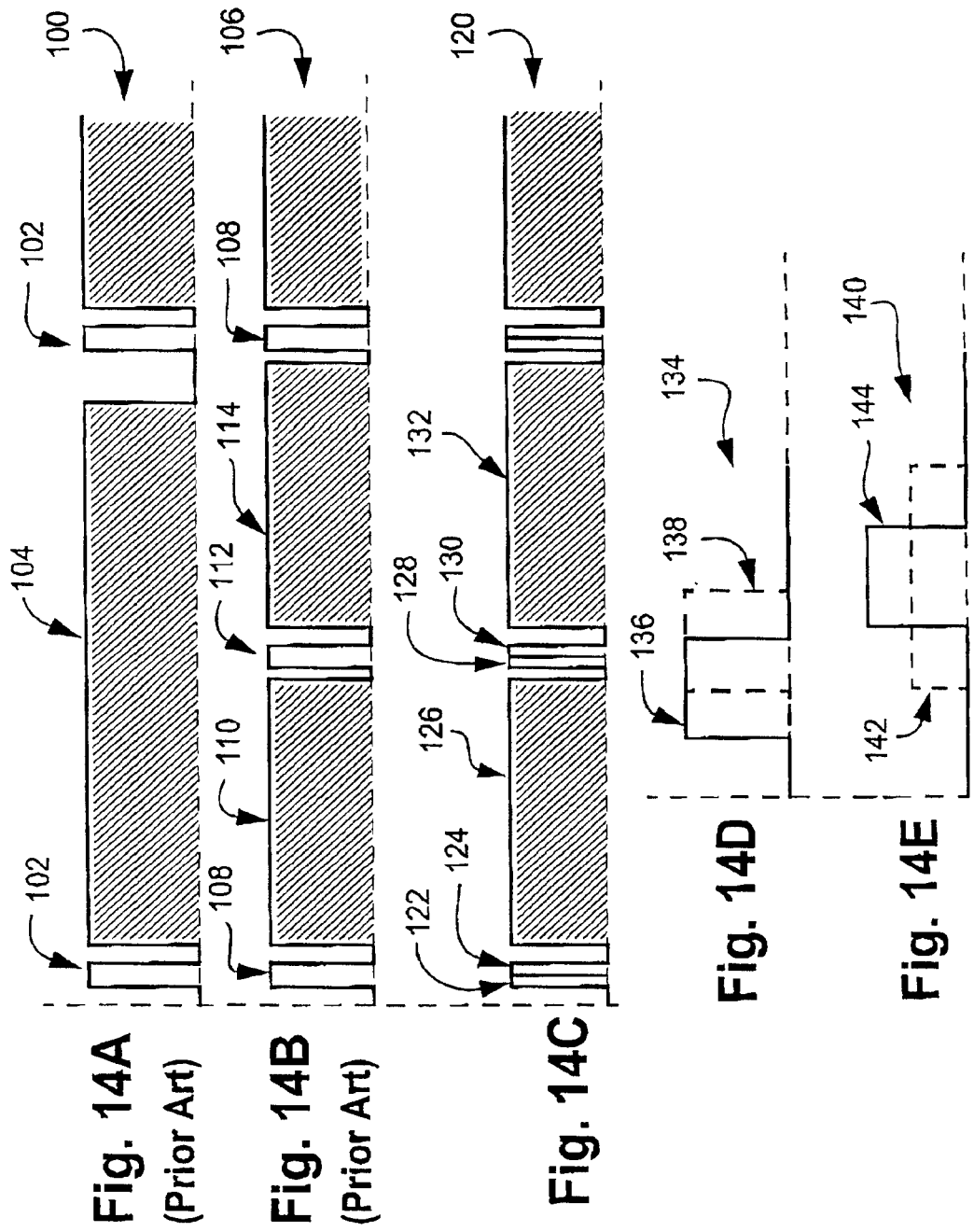
FIGS. 14A to 14E provide comparisons between image capture according to prior art arrangements and those according to embodiments of the present invention.

The above can be readily seen from FIGS. 14A to 14E. FIG. 14A shows a prior art video signal 100 where an image frame is captured during period 102 and output from the sensor during a period 104 prior to the next frame 102 being captured. FIG. 14B shows a similar signal 106 for an interlaced frame where a first field 108 is captured and output over a period 110. A second field 112 is captured and output over a period 114 prior to the first field of the next frame being captured.

According to an implementation, as shown in FIG. 14C, a first row of a first image 122 is captured followed by a first row of a second image 124, the second image for example corresponding to the first field 108 of FIG. 14B. The data of the two first rows 122 and 124 is output during a period 126 before the second rows 128 and 130 of the images are captured and output during the period 132. It is noted that the periods 126 and 132 are not drawn to scale as the period required to output a single row is shorter that that required to output a whole image, such as in period 104 of FIG. 14A.

Whilst FIG. 14C shows the rows of motion blur images being captured one immediately after the other, such need not always be the case. As seen in FIG. 14D, a capture sequence 134 includes the capture of a row of a first blur image 136 overlapping with the capture of a row of a second blur image 138. In FIG. 14E, a capture sequence 140 involves capturing a row of one image 142 over a period twice that of a row of another image 144.

The multiple capture ability of the described arrangement derives from the duplication of the switching arrangements 66 of FIG. 9. As a consequence, further duplication can result in further images being captured in association. Such may be useful in high speed photography of transient events where the capture time permits capturing the event, but where the time required to output buffer the image data exceeds the time available to enable use of traditional video systems.

Figure 15:
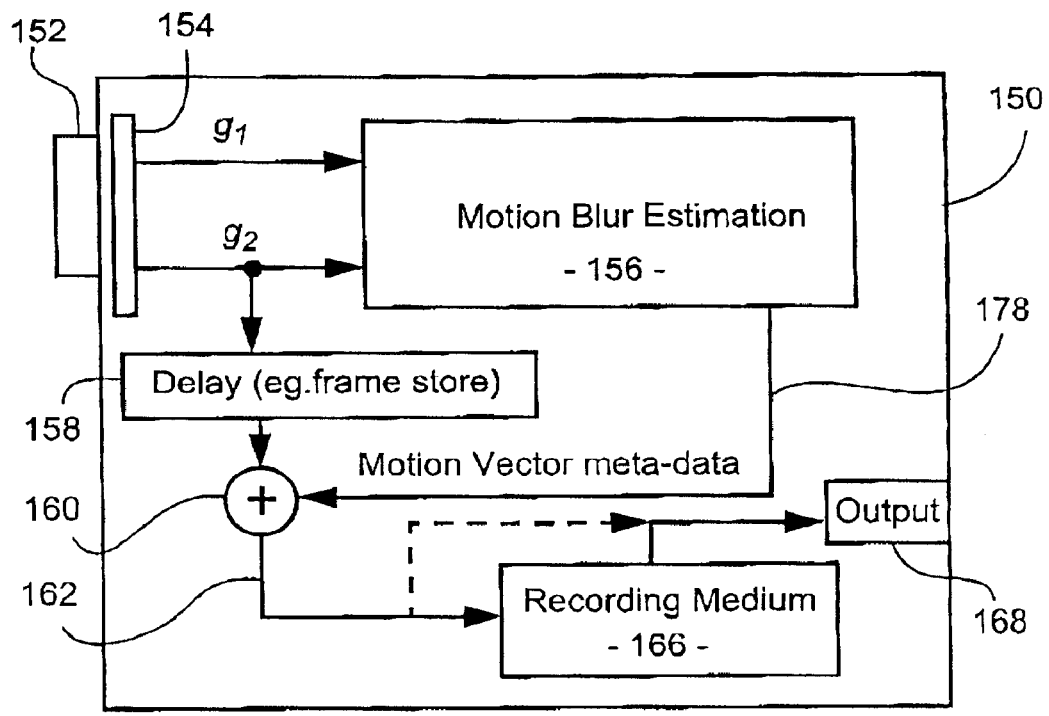
FIGS. 15 and 16 depict capture devices according to embodiments of the invention.

A specific advantage afforded is that the image sensor 10 used to capture the images from which motion blur is estimated, can be implemented in a number of configurations. In one configuration, shown in FIG. 15, the image sensor 10 can be the sensor from which the image to be ultimately displayed or otherwise reproduced is obtained. There, a video camera 150 is illustrated which includes a lens 152 and a charge-coupled device sensor 154 constructed according to the arrangement of FIG. 9. The sensor 154 outputs the two blur images $g_1$ and $g_2$ to a motion blur estimation unit 156 according to the above description. The image $g_2$ also forms an output image of the camera 150 and is combined in a summer with motion vector metadata 164 output from the unit 156. A delay 158 such as a frame store may be used to ensure that the motion blur data is synchronised to the corresponding output image frame. The combined signal may be stored on a recording medium, such as tape or disk, for output 168 from the camera 150.

Figure 16:
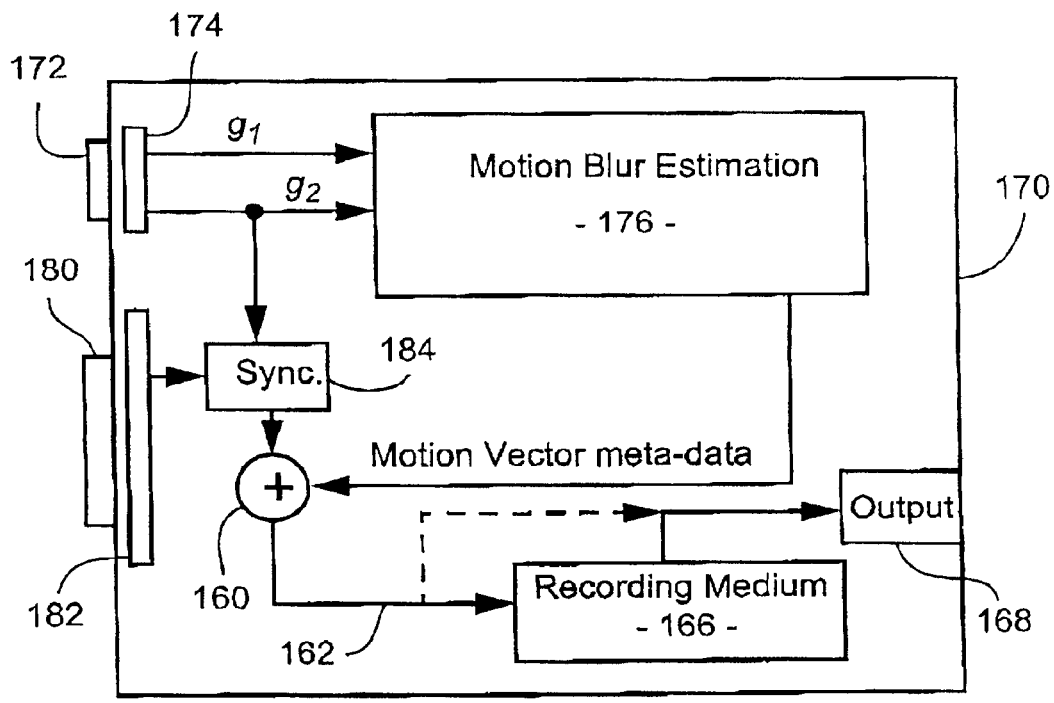

Alternatively, as shown in the digital video camera 170 of FIG. 16, the image sensor 10 can be additional to that used to form the image output. In FIG. 16, the camera 170 includes a traditional lens 180 and CCD sensor 182 for capturing images in a traditional fashion. A further image sensor 174 constructed according to the principles of FIG. 9 is provided and associated with a corresponding lens 172 for detection of image motion blur. Where desired, the camera 170 may include only a single lens (not illustrated) and associated optics for directing the image being viewed to each of the sensors 174 and 182. As seen from FIG. 16, the sensor 174 is depicted smaller than the sensor 182. In this regard, since motion blur is generally regional within an image, rather than randomised on a pixel-by-pixel basis, a lower resolution sensor may be used. Such facilitates optimising the computational complexity of the motion estimation unit 176 by simplifying the correlations and transforms where appropriate. A synchronisation unit 184 is provided to ensure the appropriate motion vector metadata 178 is matched with the corresponding image output from the sensor 182. Other components of the camera 170 perform corresponding functions to those of FIG. 15.

Figure 17:
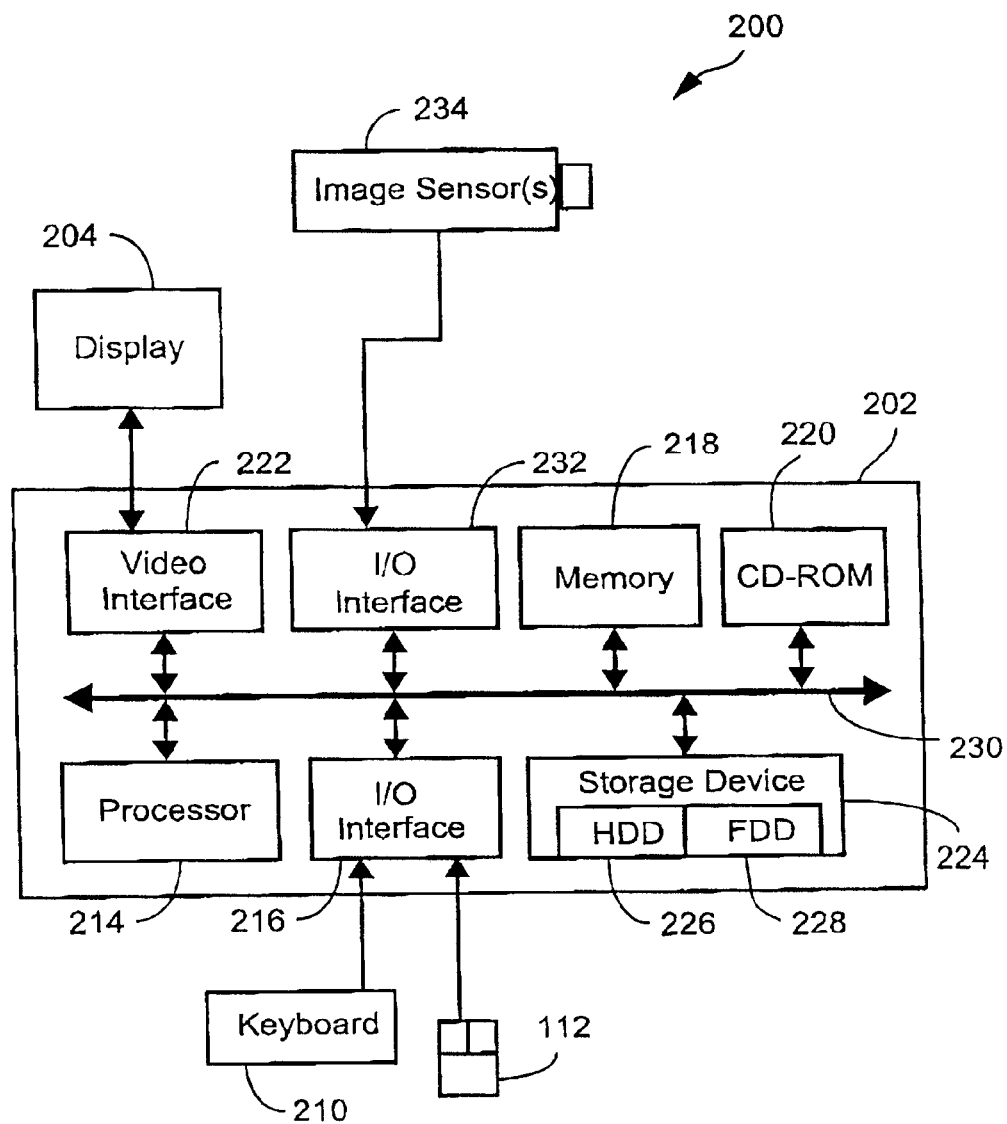
FIG. 17 is a schematic block diagram of a general purpose computer.

The blur image processing methods described above and schematically illustrated in FIG. 8 may alternatively be practiced using a conventional general-purpose computer system 200, such as that shown in FIG. 17 wherein the Fourier Transform as well as the auto-correlation and cross-correlation calculations, error function calculation and extreme location may be implemented as software, such as an application program executing within the computer system 200. In particular, those calculations are effected by instructions in the software that are carried out by the computer, The software may be stored in a computer readable medium, including the storage devices described below. The software is loaded into the computer from the computer readable medium, and then executed by the computer. A computer readable medium having such software or computer program recorded on it is a computer program product.

The computer system 200 comprises a computer module 202, input devices such as a keyboard 210 and mouse 212, output devices including a display device 204. The computer module 202 typically includes at least one processor unit 214, a memory unit 218, for example formed from semiconductor random access memory (RAM) and read only memory (ROM), input/output (I/O) interfaces including a video interface 222, and an I/O interface 216 for the keyboard 210 and mouse 212 and peripherals interface 232, to which an appropriate image sensor(s) 234 is connected to provide image pixel data to the computer module 202. A storage device 224 is provided and typically includes a hard disk drive 226 and a floppy disk drive 228. A magnetic tape drive (not illustrated) may also be used. A CD-ROM drive 220 is typically provided as a nonvolatile source of data. The components 214 to 228 of the computer module 202, typically communicate via an interconnected bus 230 and in a manner which results in a conventional mode of operation of the computer system 200 known to those in the relevant art. Examples of computers on which the implementations can be practised include IBM-PC's and compatibles, San Sparcstations or alike computer systems evolved therefrom.

Typically, the application program of the preferred implementation is resident on the hard disk drive 226 and read and controlled in its execution by the processor 214. Intermediate storage of the program may be accomplished using the semiconductor memory 218, possibly in concert with the hard disk drive 228. In some instances, the application program may be supplied to the user encoded on a CD-ROM or floppy disk and read via the corresponding drive 220 or 228. Still further, the software can also be loaded into the computer system 200 from other computer readable medium including magnetic tape, a ROM or integrated circuit, a magneto-optical disk, a radio or infrared transmission channel between the computer module 202 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The calculation of the Fourier transforms as well as the auto-correlation and the cross-correlation may alternatively be implemented in dedicated hardware such as one or more integrated circuits performing these functions or parts thereof. Such dedicated hardware may include graphic processors, digital signal processors, or one or more microprocessors and associated memories.

The implementations described permit the estimation of motion of an object captured in an image through obtaining at least two blur images where traditionally only a single image would be obtained. The blur images are then processed to determine motion parameters across the pair of images. The motion parameters may then be associated with one of the images, usually the second of the two, two provide an image with corresponding motion parameters obtained during the generation of the (second) image. The motion parameters may then be used as desired for object identification within the image, for example. Where the images for a sequence of such images, the motion parameters permit the tracking or other monitoring of moving objects contained within the image sequence. Motion detection using an implementation is desirable because such associates one motion vector map to each frame or field, which not only is smaller in magnitude thereby affording finer resolution, but also a more accurate representation of motion.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including" and not "consisting only of". Variations of the word comprising, such as "comprise" and "comprises" have corresponding meanings.

We claim:

1. A method of estimating motion of a moving object, said method comprising the steps of:

capturing at least first and second blurred images of the moving object, the blur in the first and second blurred images arising from at least motion blur of the object, wherein exposure durations of the first and second blurred images overlap at least partially;

generating an error function, the error function being a function of the first blurred image and the second blurred image;

minimising the error function; and estimating the motion of the object from the minimised error function.

2. A method according to claim 1, wherein the images are captured with a time difference between a start time of capture of the first blurred image and a start time of capture of the second blurred image.

3. A method according to claim 1, wherein a start time of capture of the first blurred image and a start time of capture of the second blurred image are concurrent.

4. A method according to claim 2, wherein the exposure duration of the first blurred image is substantially equal to the exposure duration of the second blurred image.

5. A method according to claim 2 or 3, wherein the exposure duration of the second blurred image is a predetermined integer multiple of the exposure duration of the first blurred image.

6. A method according to claim 1, wherein an exposure pattern (profile) of the exposure duration of at least one of the first and second blurred images is non-uniform.

7. A method according to claim 6, wherein the exposure pattern (profile) comprises a triangular profile.

8. A method of estimating motion of a moving object, said method comprising the steps of:

capturing at least first and second blurred images of the moving object, the blur in the first and second blurred images arising from at least motion blur of the object, wherein exposure durations of the first and second blurred images overlap at least partially;

generating an error function, the error function comprising a cross-correlation term being a cross-correlation between the first blurred image and the second blurred image;

minimising the generated error function; and estimating the object motion from the minimised error function.

9. A method according to claim 8, wherein the error function further comprises an auto-correlation term being an auto-correlation of the first blurred image.

10. An apparatus for estimating motion of a moving object, said apparatus comprising:

one or more capture devices for capturing at least first and second blurred images of the moving object, the blur in the first and second blurred images arising from at least motion blur of the object, wherein exposure durations of the first and second blurred images overlap at least partially;

means for generating an error function, the error function being a function of the first blurred image and the second blurred image;

means for minimising the error function; and means for estimating the motion of the object from the minimised error function.

11. The apparatus according to claim 10, wherein the images are captured with a time difference between a start time of capture of the first blurred image and a start time of capture of the second blurred image.

12. The apparatus according to claim 10, wherein a start time of capture of the first blurred image and a start time of capture of the second blurred image are concurrent.

13. The apparatus according to claim 11, wherein the exposure duration of the first blurred image is substantially equal to the exposure duration of the second blurred image.

14. The apparatus according to claim 11 or 12, wherein the exposure duration of the second blurred image is a predetermined integer multiple of the exposure duration of the first blurred image.

15. The apparatus according to claim 10, wherein an exposure pattern (profile) of the exposure duration of at least one of the first and second blurred images is non-uniform.

16. The apparatus according to claim 15, wherein the exposure pattern (profile) comprises a triangular profile.

17. The apparatus according to claim 10, wherein said means for generating, said means for minimising, and said means for estimation, collectively comprise a computer system incorporating a sequence of program instructions for estimating the motion using the images output from the one or more capture devices.

18. An apparatus for estimating motion of a moving object, said apparatus comprising:

one or more capture devices for capturing at least first and second blurred images of the moving object, the blur in the first and second blurred images arising from at least motion blur of the object, wherein exposure durations of the first and second blurred images overlap at least partially;

means for generating an error function, the error function comprising a cross-correlation term being a cross-correlation between the first blurred image and the second blurred image;

means for minimising the generated error function; and means for estimating the object motion from the minimised error function.

19. The apparatus according to claim 18, wherein the error function further comprises an auto-correlation term being an auto-correlation of the first blurred image.

20. A computer program product including a computer readable medium incorporating a computer program estimating motion of a moving object, said computer program product comprising:

code for capturing at least first and second blurred images of the moving object, the blur in the first and second blurred images arising from at least motion blur of the object, wherein exposure durations of the first and second blurred images overlap at least partially;

code for generating an error function, the error function being a function of the first blurred image and the second blurred image;

code for minimising the error function; and code for estimating the motion of the object from the minimised error function.

21. A computer program product according to claim 20, wherein the images are captured with a time difference between a start time of capture of the first blurred image and a start time of capture of the second blurred image.

22. A computer program product according to claim 20, wherein a start time of capture of the first blurred image and a start time of capture of the second blurred image are concurrent.

23. A computer program product according to claim 21, wherein the exposure duration of the first blurred image is substantially equal to the exposure duration of the second blurred image.

24. A computer program product according to claim 21 or 22, wherein the exposure duration of the second blurred image is a predetermined integer multiple of the exposure duration of the first blurred image.

25. A computer program product according to claim 20, wherein an exposure pattern (profile) of the exposure duration of at least one of the first and second blurred images is non-uniform.

* * * * *

UNITED STATES PATENT AND TRADEMARK OFFICE
CERTIFICATE OF CORRECTION

PATENT NO. : 6,888,566 B2
DATED : May 3, 2005
INVENTOR(S) : Kieran Gerard Larkin et al.

It is certified that error appears in the above-identified patent and that said Letters Patent is hereby corrected as shown below:

Column 1,
Line 43, "sequence, As" should read -- sequence. As --.

Column 2,
Line 6, "comprising;" should read -- comprising: --.

Column 3,
Line 12, "and" should be deleted.
Line 14, "invention;" should read -- invention; and --.

Column 5,
Line 2, "ilustrated" should read -- illustrated --.
Line 20, "above is," should read -- above, --.
Line 23, "image)," should read -- image). --.

Column 6,
Line 23, (the middle of the three equations) "$G_2$" should read -- $G_1$ --.

Column 7,
Line 2, "it's" should read -- its --.
Line 10, "correlations" should read -- correlations. --.
Line 19, "and $b_2$" should read -- and $b_2$. --.
Line 44, "tern" should read -- term --.

Column 8,
Line 43, "dudv" should read -- dudv – --.
Line 52, "located," should read -- located. --.
Line 53, "functions)." should read -- functions. --.

Column 9,
Line 19, "resealing" should read -- re-scaling --.

Column 10,
Lines 15 and 53, "auto" should read -- auto- --.

Column 11,
Line 11, "digitally" should read -- digital --.

Column 12,
Line 27, "riot" should read -- not --.

UNITED STATES PATENT AND TRADEMARK OFFICE
CERTIFICATE OF CORRECTION

PATENT NO. : 6,888,566 B2
DATED : May 3, 2005
INVENTOR(S) : Kieran Gerard Larkin et al.

It is certified that error appears in the above-identified patent and that said Letters Patent is hereby corrected as shown below:

Column 13,
Line 4, "'Tex'" should read -- 'Tex'. --.
Line 10, "ill" should read -- in --.

Column 14,
Line 15, "78 to S1" should read -- 78 to 81 --.
Line 21, "column" should read -- columns --.
Line 66, "value of N," should read -- value of N; --.

Column 15,
Line 32, "recorded" should read -- recorded. --.

Column 21,
Line 37, "computer," should read -- computer. --.
Line 63, "San" should read -- Sun --.

Column 22,
Line 30, "two" (second occurrence) should read -- to --.

Signed and Sealed this

Twenty-seventh Day of December, 2005

JON W. DUDAS
*Director of the United States Patent and Trademark Office*